US008416781B2

(12) United States Patent
Shatsky et al.

(10) Patent No.: US 8,416,781 B2
(45) Date of Patent: Apr. 9, 2013

(54) SYSTEM AND METHOD FOR SESSION INITIATION PROTOCOL HEADER MODIFICATION

(75) Inventors: Alex Shatsky, Ontario (CA); Andrew Allen, Mundelein, IL (US); Adrian Buckley, Tracy, CA (US); Jan Hendrik Lucas Bakker, Irving, TX (US); Brian McColgan, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 441 days.

(21) Appl. No.: 12/611,769

(22) Filed: Nov. 3, 2009

(65) Prior Publication Data
US 2011/0103373 A1    May 5, 2011

(51) Int. Cl.
*H04L 12/56* (2006.01)
(52) U.S. Cl.
USPC .......................................................... 370/392
(58) Field of Classification Search .................. None
See application file for complete search history.

(56) References Cited

U.S. PATENT DOCUMENTS

| 2003/0156631 | A1* | 8/2003 | McPherson et al. | 375/152 |
| 2005/0015503 | A1* | 1/2005 | Edwiges et al. | 709/228 |
| 2007/0041528 | A1* | 2/2007 | Menon et al. | 379/90.01 |
| 2008/0160906 | A1* | 7/2008 | Ranjan et al. | 455/3.01 |
| 2008/0170563 | A1* | 7/2008 | Zhu et al. | 370/352 |
| 2009/0129388 | A1* | 5/2009 | Akhtar et al. | 370/392 |
| 2009/0248800 | A1* | 10/2009 | Chu et al. | 709/204 |

* cited by examiner

*Primary Examiner* — Yong Zhou
(74) *Attorney, Agent, or Firm* — Quarles & Brady LLP

(57) ABSTRACT

A user agent (UA) for communicating with a communications network implementing an internet protocol (IP) multimedia subsystem (IMS) is presented. The UA is configured to send and receive session initiation protocol (SIP) messages. The UA includes a processor configured to send a message to the network. The message identifies an application policy. The application policy defines at least one of a SIP message header field to include, a SIP message header field to remove, a SIP message header field to allow, and a SIP message header field to modify. The processor is configured to receive a SIP message from the network. The SIP message includes a set of SIP message header fields. The set of SIP message header fields are modified in accordance with the application policy.

25 Claims, 10 Drawing Sheets

SYSTEM AND METHOD FOR SESSION INITIATION PROTOCOL HEADER MODIFICATION

BACKGROUND

The present disclosure relates generally to message header modification and more specifically to an improved system and method for session initiation protocol (SIP) message header modification.

As used herein, the terms "User Equipment" and "UE" can refer to wireless devices such as mobile telephones, personal digital assistants, handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes. Throughout this disclosure, UE may refer to any SIP UA such as a wireless device, set-top box, or other communication devices and is interchangeable with the term UA.

In Third Generation Partnership Project (3GPP) systems, an internet protocol (IP) multimedia subsystem (IMS) allows for the delivery of IP multimedia services. Using IMS, a UA may transmit and receive multimedia and/or voice packet switched (PS) communications via a base station implementing one or more IMS Functional Components. To implement IMS, networks rely upon session initiation protocol (SIP) to provide a text-based signaling protocol that may be used to communicate between a UA and the IMS Core Network (CN), between the IMS CN and Application Servers, and between various other components of the IMS Network.

SIP messages may include several elements such as mandatory request uniform resource identifiers (URIs) or status codes, textual status representations, and a body containing zero or more body parts (if at least one body is present, additional headers or header fields may also be present describing the body). SIP message may be one of the following types: a SIP method, a SIP request or a SIP response. In the present disclosure, the terms SIP method and SIP request are interchangeable and may refer to the same SIP message type. If the SIP message includes zero bodies, the message includes a Content-Length header having a field set to 0. The SIP messages also include mandatory headers with SIP transaction or session information, mandatory headers with user and authentication information, mandatory headers with routing information, and optional headers that can be used by IMS applications and services to communicate application and/or service specific information. Therefore, existing SIP messages tend to be verbose and are generally required to include substantial amounts of information. As a result, SIP has substantial overhead—in some cases, the average size of a SIP message without payload may exceed 700 Bytes.

In addition to the mandatory header fields, SIP messages may include any number of optional fields. Because SIP is designed to be extended, future extensions may define new methods and associated header fields at any time. As a result, applications and services can define new extensions of the protocol and thereby define new application or service specific SIP headers to be included within a SIP message.

Depending upon a UA's capabilities, the UA may or may not be able to use the optional headers included in a SIP message. Generally, any new headers are optional for applications and services that do not support the extensions. In many cases, the absence of a SIP option tag suggests that the UA does not support the extension and its associated header or header fields. If the UA does not support the service, the UA may be configured to disregard the unusable header or header fields. Unfortunately, because an application or service initiating an IMS session may not be aware of the capabilities of its peer, the application or service may insert multiple headers or header fields into SIP messages under the assumption the headers will be used by the peer UA. If, however, the peer UA does not support the service, the additional information will be discarded and its transmission wasted.

FIG. 1 is an illustration of a UA receiving a SIP message including optional SIP headers. In the example, UA 20 does not support the service that relies upon the optional headers. In a first step, UA 10 sends a SIP INVITE message 12 with several optional headers (see underlined text) to proxy call session control function (P-CSCF) 14 for delivery to UA 20. In this example, UA 20 does not support the application or service associated with the optional headers.

In one implementation, P-CSCF 14 is an entity defined by 3GPP TS 23.228 IMS. P-CSCF 14 is the first contact point for a UA within the IMS core network (CN) subsystem and, as such, P-CSCF 14 may behave like a Proxy (e.g., as defined in IETF RFC 3261 SIP: Session Initiation Protocol). Accordingly, P-CSCF 14 may accept requests and then service them internally, or forward them on to another network component.

After receiving SIP INVITE message 12, P-CSCF 14 routes message 12 to serving CSCF (S-CSCF) 16. S-CSCF 16 may be an entity defined by 3GPP TS 23.228 IMS, for example. S-CSCF 16 may then provide session control services for the UA and maintain a session state as needed by the network operator for support of those services.

S-CSCF 16 then routes the SIP INVITE message 12 to P-CSCF 18 and UA 20. As shown in FIG. 1, SIP INVITE message 12 received by UA 20 includes the original optional headers that were setup and transmitted by UA 10 in the original SIP INVITE transmission. In this example, however, because UA 20 does not use the optional headers, the headers are dropped by UA 20 during message processing or parsing. As such, the original transmission of the headers represents a wasted transmission because the information was never used, and is incapable of being used, by UA 20. Optional headers may be disregarded by UAs, UEs, peer applications or services if they cannot be used.

With respect to outgoing transmissions, if a UA or an Application Server (AS) supports a certain SIP extension, the UA or AS inserts optional headers into the message before sending the message to the IMS network. The values of the optional headers depend upon the type of SIP extension that is supported by the UA. The header values can be dynamically changed within a SIP session (e.g., Date, and Timestamp headers), or may be static (e.g., User-Agent, Allow, and Allow-Events headers) and have the same value for an extended period of time. The static values can be changed, for example, when the UA is upgraded or a configuration is modified by a user. Accordingly, there may be a subset of SIP headers that include relatively static values that are not changed for extended periods of time.

In addition to the optional SIP headers that may be included in a SIP message based upon the capabilities of a UA or AS, SIP messages headers may also include routing information. For example, a simple SIP message, while traversing multiple IMS networks, may accumulate routing information in the form of Via, Record-Route and Route SIP headers. The size and number of the headers that contain routing information can significantly affect performance of the UA's processor when the message is processed. The processing of additional routing headers may also consume extra power of a wireless UA when the UA receives or transmits the data. An example of the SIP PRACK message with extra Via-headers is presented below in Table 1.

TABLE 1

| | |
|---|---|
| PRACK sip:[5555::eee:fff:aaa:bbb]:8805;comp=sigcomp SIP/2.0 | |
| Via: | SIP/2.0/UDP |
| pcscf2.home2.net:5088;comp=sigcomp;branch=z9hG4bK876t12.1, | SIP/2.0/UDP |
| scscf2.home2.net;branch=z9hG4bK764z87.1, | SIP/2.0/UDP |
| scscf1.home1.net;branch=z9hG4bK332b23.1, | SIP/2.0/UDP |
| pcscf1.home1.net;branch=z9hG4bK431h23.1, | SIP/2.0/UDP |
| [5555::aaa:bbb:ccc:ddd]:1357;comp=sigcomp;branch=z9hG4bKnashds7 | |
| Max-Forwards: 66 | |
| From: <sip:user1_public1@home1.net>;tag=171828 | |
| To: <tel:+1-212-555-2222>;tag=314159 | |
| Call-ID: cb03a0s09a2sdfglkj490333 | |
| Cseq: 128 | |
| RAck: 9022 127 INVITE | |
| Content-Length:0 | |

As can be seen from the SIP message illustrated in Table 1, the size of the extra Via-headers (at least one Via header is mandatory) is 42% of the total message size (in the example, total message size is 570 bytes, total size of the 2nd-5th Via-headers is 334 bytes). As a result, the IMS stack that processes the message will parse 12 SIP headers, but would only process 8 SIP headers if the extra Via-headers were removed from the message.

Another example of a SIP ACK message is presented in Table 2.

TABLE 2

| | |
|---|---|
| ACK sip:[5555::eee:fff:aaa:bbb]:8805;comp=sigcomp SIP/2.0 | |
| Via: SIP/2.0/UDP | SIP/2.0/UDP |
| pcscf2.visited2.net:5088;branch=z9hG4bK361k21.1, | |
| icscf2_s.home1.net;branch=z9hG4bK871y12.1, | SIP/2.0/UDP |
| SIP/2.0/UDP Token( | |
| scscf2.home1.net;branch=z9hG4bK764z87.1, | SIP/2.0/UDP |
| scscf1.home1.net;branch=z9hG4bK332b23.1, | SIP/2.0/UDP |
| pcscf1.home1.net;branch=z9hG4bK431h23.1)@home1.net;tokenized- | |
| by=home1.net, | SIP/2.0/UDP |
| [5555::aaa:bbb:ccc:ddd]:1357;comp=sigcomp;branch=z9hG4bKnashds7 | |
| Max-Forwards: 66 | |
| From: <sip:user1_public1@home1.net>;tag=171728 | |
| To: <tel:+1-212-555-2222>;tag=314259 | |
| Call-ID: cb03a0s09a2sdfglkj490233 | |
| Cseq: 128 ACK | |
| Content-Length: 0 | |

As shown in Table 2, the total size of the message including extra Via-headers is 641 bytes. The total size of the message with one Via-header would be 298 bytes. Accordingly, by removing extra routing headers, the message size may be reduced by 54%. In that case, the IMS stack would parse only 7 SIP headers as compared to 12 when the extra Via-headers are presented in the message.

In many cases, SIP message structure is inefficient and verbose resulting in substantial amounts of data being transmitted via the network that will ultimately be discarded by a UA or other network component receiving the information. For example, there are several categories of information that need not be transmitted, or only transmitted intermittently resulting in a decrease in the volume of data being transmitted. The categories include SIP message elements (such as header fields) that are ultimately discarded by a UA, SIP message elements with static values, and extra or superfluous routing headers. Without a mechanism for controlling the information included in SIP transmissions, there may be excessive use of IMS Network resources, excessive use of the Radio Access Network (RAN) by wireless UAs, delays for parsing and processing of the optional and routing headers by the components of IMS network, and unnecessary consumption of wireless UA resources (e.g., battery usage, and memory consumption required to process and manipulate the optional headers and routing headers). As such, there is a need to control and modify optional and routing headers present in underlying SIP messages within an IMS network implementation.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
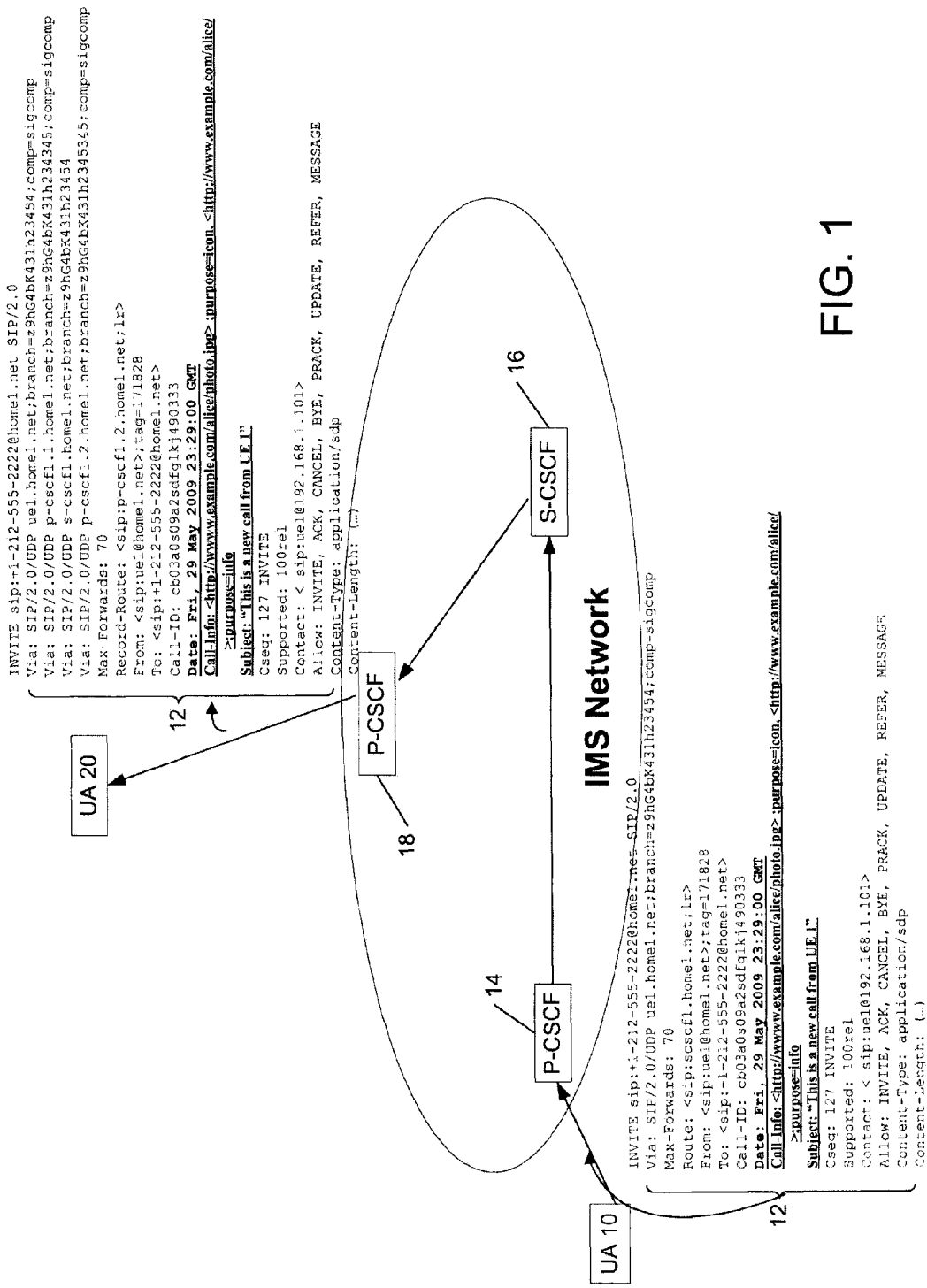
FIG. 1 is an illustration of a user equipment (UE) receiving a session initiation protocol (SIP) message including optional SIP headers.

The present disclosure relates generally to message header modification and more specifically to an improved system and method for session initiation protocol (SIP) message header modification.

To this end, some embodiments include a method for modifying the contents of session initiation protocol (SIP) messages. The method includes receiving a SIP message. The SIP message comprises a set of message header fields. The method includes receiving an application policy. The application policy specifies how to modify the SIP message based on a characteristic of the SIP message. The method includes using the application policy to modify the SIP message resulting in a modified message, and sending the modified message.

Other embodiments include a method for modifying session initiation protocol (SIP) header fields. The method includes receiving a transmission from a user agent (UA), the transmission including a provisioning directive identifying an application policy. The method includes receiving a SIP message, the SIP message being addressed to the UA and including a set of message header fields, and using the application policy to modify the set of message header fields in the received SIP message.

Other embodiments include a method for modifying session initiation protocol (SIP) header fields. The method includes receiving a SIP message. The SIP message is addressed to a UA and includes a set of message header fields. The method includes retrieving an application policy from a database. The database may be provided by a home subscriber server (HSS) or an Application Server The application policy is associated with the UA. The method includes using the application policy to modify the set of message header fields in the SIP message to generate a modified SIP message, and sending the modified SIP message to the UA.

Other embodiments include a network entity for modifying session initiation protocol (SIP) headers. The network entity includes a processor. The processor is configured to access an application policy. The application policy defines at least one of a SIP message header field to include, a SIP message header field to remove, a SIP message header to allow, and a SIP message header field to modify. The processor is configured to receive a SIP message, the SIP message including a set of message header fields, and use the application policy to modify the set of message header fields in the SIP message.

Other embodiments include a user agent (UA) for communicating with a communications network implementing an internet protocol (IP) multimedia subsystem (IMS). The UA is configured to send and receive session initiation protocol (SIP) messages. The UA includes a processor configured to send a message to the network. The message identifies an application policy. The application policy defines at least one of a SIP message header field to include, a SIP message header field to remove, a SIP message header to allow, and a SIP message header field to modify. The processor is configured to receive a SIP message from the network. The SIP message includes a set of SIP message header fields. The set of SIP message header fields are modified in accordance with the application policy.

Other embodiments include a user agent (UA) for communicating with a communications network implementing an internet protocol (IP) multimedia subsystem (IMS). The UA is configured to send and receive session initiation protocol (SIP) messages. The UA includes a processor configured to receive a SIP message from the network. The SIP message includes a set of SIP message header fields. The set of SIP message header fields are modified by a Functional Component of the network in accordance with an application policy associated with the UA. The application policy defines at least one of a SIP message header field to include, a SIP message header field to remove, a SIP message header to allow, and a SIP message header field to modify.

Other embodiments include a user agent (UA) for communicating with a communications network implementing an internet protocol (IP) multimedia subsystem (IMS). The UA is configured to send and receive session initiation protocol (SIP) messages. The UA includes a processor configured to send a SIP message to the network. The SIP message includes a set of SIP message header fields. The set of SIP message header fields are modified by the UA in accordance with an application policy associated with the UA. The application policy defines at least one of a SIP message header field to include, a SIP message header field to remove, a SIP message header to allow, and a SIP message header field to modify.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

To implement IMS, networks rely upon SIP to provide a text-based signaling protocol that may be used to communicate between a UA and the IMS Core Network (CN), the IMS CN and Application Servers, and various components of the IMS Network. SIP messages are generally required to include substantial amounts of information. As a result, SIP has substantial overhead—in some cases, the average size of a SIP message without payload may exceed 700 Bytes. Without a mechanism for controlling the information included in SIP transmissions, there may be excessive use of IMS Network resources, excessive use of the Radio Access Network (RAN) by wireless UAs, delays for parsing and processing of the optional and routing headers by the components of IMS network, and unnecessary consumption of wireless UA resources (e.g., battery usage, and memory consumption required to manipulate the optional and routing headers).

There are several specific categories of SIP header information that need not be transmitted, or may be transmitted intermittently. The categories include SIP message elements (such as header fields) that are ultimately discarded by a UA, SIP message elements with static values and extra or superfluous routing headers. The present system and method modifies the contents of SIP messages (including their headers) distributed via a network to minimize the transmission of information that will be discarded, or that varies infrequently, thereby improving network and UA performance.

The present system provides a mechanism for regulating or otherwise modifying the structure of optional and/or routing SIP message headers in an IMS network. As such, the system may control the composition of various types of SIP message headers by removing, including or modifying various SIP message elements. In the present system, an application policy or header-management document may be provided to an IMS Functional Component and may be used to regulate the existence of SIP header fields including optional and routing header fields in a SIP message transmitted via the IMS network.

The application policy includes a set of rules, criteria and/or directives and may instruct or direct an IMS Functional Component to remove optional and/or routing headers when the SIP message is being sent to a UA, include or add SIP header fields, or modify the contents of the SIP header fields. The application policy may define rules for an application or a service and may be supported through a common policy mechanism as described in IETF RFC 4745 Common Policy: A Document Format for Expressing Privacy Preferences. In some cases, the present system may apply to Functional Components of SIP networks. A mapping between Functional Components of IMS and SIP networks is provided in Table 3.

TABLE 3

| IMS Network | SIP Network |
| --- | --- |
| AS | SIP Application Server (e.g. IP-PBX, SIP Presence Server, etc) |
| HSS | User/Subscriber Database |
| IBCF | SBC (Session Border Controller) |
| I-CSCF | SIP Proxy |
| P-CSCF | SIP Proxy |
| S-CSCF | SIP Registrar and/or SIP Proxy |
| UE | UA (User Agent) |

In a first implementation of the present system, a UA is configured to transmit a SIP subscription or registration to an S-CSCF or other network component. The subscription or registration message includes an indication that contains application policy settings that may be used to regulate the structure of SIP message elements of SIP messages that are received or sent by the UA. Alternatively, IMS Functional Components acting on behalf of a UA may execute a registration or subscription processes using a similar mechanism.

After receiving the application policy, the S-CSCF may be configured to send the subscription or registration to an appropriate IMS Functional Component (e.g. an Application Server). Alternatively, a CSCF may host the application policy. An IMS Functional Component may be configured to establish policies for all messages received from or addressed to the UA and then apply the resulting application policy to remove or modify (in the case of messages addressed to the UA), and include or modify (in the case of messages that are received from the UA) certain SIP message elements.

In a second implementation, the application policy is made available from a database (e.g. the home subscriber server (HSS) in an IMS network), or some other persistent storage mechanism. The database may be internal or external. If external, the database may include an HSS or an Application Server, for example. In that case, the IMS Functional Component (e.g. Application Server) retrieves the application policy from the database. The IMS Functional Component may then use the application policy to remove or modify (in the case of messages addressed to the UA) or include or modify (in the case of messages that are received from the UA and are proxied to the network) optional and routing SIP headers.

In a third implementation, SIP SigComp (see, for example, IETF RFC 5049 Applying Signaling Compression (SigComp) to the Session Initiation Protocol (SIP), and IETF RFC 3320 Signalling Compression (SigComp) could be enhanced to remove, include or modify SIP message elements when appropriate. The SigComp communicating endpoints may be configured to map certain SIP message elements to an empty string (i.e. remove) or to map certain string tokens to SIP message elements in accordance with a SigComp dictionary (i.e. include/modify), and/or as per application policy.

The system may operate in either a "push" or a "pull" configuration with regard to provisioning of the application policy. In a push configuration, the network does not request the application policy. Instead, the UA unilaterally transmits the application policy or a reference to the application policy to the network. Upon receiving the transmission, the network (e.g., via a Functional Component) may implement the policy. If, however, the UA never transmits the policy or a reference to the network, the network may be configured to not implement a policy and, as a result, may operate in accordance with existing processes.

Alternatively, in a pull configuration, the network may specifically request the application policy or a reference to the application policy from the UA. In that case, upon receiving the request from the network, if a policy is available, the UA may transmit the policy or a reference to the policy to the network. If, however, an application policy is not available (e.g., undefined, or the UA does not wish to provide the policy), the UA may respond to the network with a message indicating no application policy is available.

Depending upon the implementation, a SIP Configuration framework or open mobile alliance (OMA) Device Management (by means of the IMS MO) may be used to indicate whether the present system is supported.

The first and second implementations above may co-exist within an IMS network. For example, the system may be configured to take into account changing UA capabilities (e.g., resulting from universal subscriber identity module (USIM) swapping, new applications or services resulting from a USIM being swapped into a more capable UA, or where the UA is now more capable due to installation of subscription to a new application or service) using a dynamic application policy. Without updating the associated application policy in an HSS database, which may be relatively static, the system may use a dynamically provided application policy and allow the dynamic policy to take precedence over a statically provisioned application policy (e.g., a policy retrieved from the HSS).

In some cases, the application policy may be comprised of static policies, dynamic policies, or a combination thereof. If multiple application policies exist, they may be established within a hierarchical framework. As such, a service provider established policy may take precedence over a subscriber specified policy. Various application policies may be defined by different entities. For example, there may be defined operator policies, policies defined by user preferences, policies defined by the UA manufacturer, etc. Generally, the multiple application policies are combined and/or applied in such a way as to establish a consistent regulation of SIP message headers.

The application policy may include both per-UA settings (i.e. the application policy only applies to an individual UA belonging to the user), as well as per-user (e.g. based on a public user identity) application policy settings. As such, an application policy may apply to a user and all that user's UAs. If a wild-card public user identity is used (e.g. *example-.com), the application policy may apply to all UAs from a given group or collection (e.g. users within a given network domain or specific corporate users).

In some cases, SIP message elements (e.g. those elements containing accumulated routing information) are not removed based on the state of the current SIP message dialogue or for other reasons (these reasons may be encoded in the application policy). For example, it may be determined that rather than remove the header field, the header field is rewritten or otherwise modified (e.g. by replacing, editing, or removing header field value elements).

In accordance with section 4.2.4 of 3GPP TS 23.228 IP Multimedia Subsystem (IMS), the S-CSCF may decide whether an Application Server is required to receive information related to an incoming initial SIP request to ensure appropriate service handling. The decision at the S-CSCF is based on filter information received from the HSS. As such, the HSS may prioritize the Functional Component (i.e. application server), and the S-CSCF may be configured using initial filter criteria (iFC) or filter criteria (FC) to select the Functional Component as the first contact point for any incoming UA SIP messages. The same Functional Component shall be the last contact point (except the P-CSCF when the UA is in the home or I-CSCF when the UA is in the visited network) for any outgoing to the UA messages. Failure to follow this order may cause the Functional Component to remove headers that might be required for processing by other applications or services. The IMS Functional Component performing regulation may be the interconnection border control function (IBCF) or an AS. It if is an AS, the iFC or FC may need to be constructed such that the AS is the last or the first AS.

Figure 2:
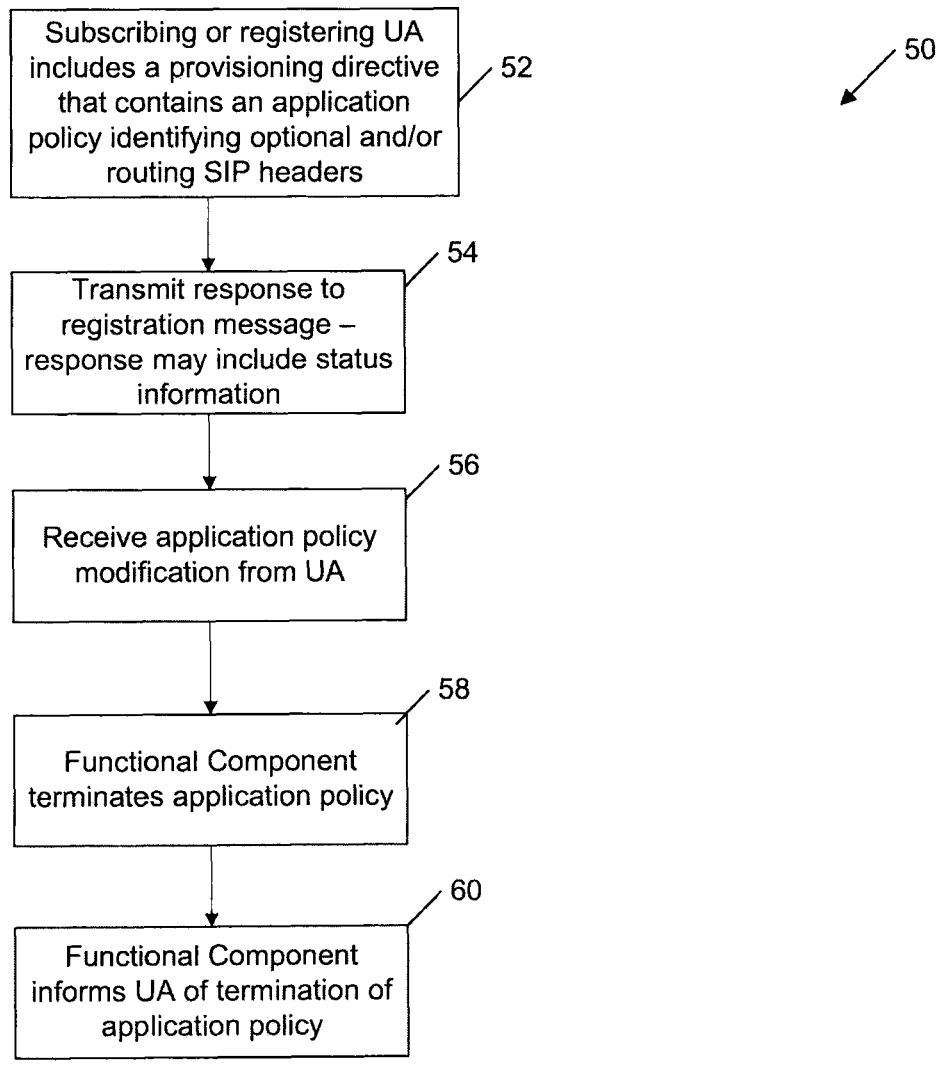
FIG. 2 is a flowchart showing an example process for provisioning an application policy to a component of an IMS network and applying the application policy to SIP messages.

FIG. 2 is a flowchart showing an example process 50 for provisioning an application policy to a component (e.g., a Functional Component) of an IMS network and applying the application policy to SIP messages by means of SIP SUBSCRIBE (or REGISTER) methods. In step 52, when subscribing or registering with the S-CSCF, the UA includes a provisioning directive that contains an application policy with optional and/or routing SIP headers.

The application policy may be included in a new header or payload type of SIP SUBSCRIBE or SIP REGISTER request when a UA subscribes or registers (or re-subscribes/re-registers) with the IMS network. For example, the "header-management" subscription-event along with the corresponding payload type with an extensible markup language (XML) body may be used to transport the application policy. Alternatively, a SIP REFER request containing a Refer-To header containing a uniform resource identifier (URI) (for example a hypertext transfer protocol (HTTP) URI) of a file containing an application policy or a SIP OPTIONS request containing a URI of the file containing an application policy (e.g., using the mechanism specified for Content Indirection defined in IETF RFC 4483 A Mechanism for Content Indirection in Session Initiation Protocol (SIP) Messages) may be used to provide the application policy.

The application policy may define several attributes for each of the rules established within the policy. For example, the policy may specify a message direction. In that case, rules that specify "incoming" messages are applied to messages that are incoming to the UA. Conversely, rules that specify "outgoing" messages are applied to the outgoing messages from the UA. For example, the "incoming" sections of the application policy may specify particular headers that are to be removed from messages that are sent to the UA. The "outgoing" sections of the application policy may define headers and values that are to be added to messages destined to the UA when the messages are proxied by the Functional Component to the IMS network.

Each of the rules within the application policy may specify a name of the IMS service (e.g., IMS communication service identities (ICSI)) or application (e.g., IMS application reference identifier (IARI)) to which the policy is applied. The application policy can also include generic sections that will be applicable to a combination of services, for example "all services", "all applications", "mmtel, ics", etc.

The policy may include SIP method names to which the application policy is applied. For example, if the application policy contains an "INVITE"-value, that portion of the application policy will be applied to SIP INVITE methods. Alternatively, the values can be specified implicitly by providing a reference to a storage from where the policy value can be retrieved.

The application policy may include a pair of SIP response codes and corresponding SIP method names to which the application policy will be applied. For example, if the policy contains a "200/INVITE"-value, the application policy will be applied to 200 response messages corresponding to a SIP INVITE. The application policy may also include a list of the headers to be removed from or added to the specified method or response.

In step 54, after receiving the application policy, a response for the SIP SUBSCRIBE or REGISTER method may be transmitted to the UA. The response may contain a status of the applied application policy, e.g. "applied successfully", "failed", "unknown", etc. Alternatively, a NOTIFY request for the established subscription may contain the status information. In addition to the status information, the Functional Component may provide the UA with additional details describing which sections or parts of the application policy were applied successfully, failed to be applied, or were ignored. This allows the UA and the Functional Component to synchronize so the UA is aware of the application policy currently being enforced by the Functional Component.

If the application policy requires that the Via, Record-Route, or Route headers are to be removed from messages sent to the UA, the Functional Component may be configured to operate in back-to-back user agent (B2BUA) mode with respect to the routing headers. As such, the Functional Component may be configured to ensure that the transaction or session on the interface facing the IMS network is terminated and a new transaction or session is constructed on the interface facing towards the UA, and vice versa. In that case, the routing information need not be proxied or otherwise transferred between the two interfaces.

If the payload type is not included in subsequent re-subscription or re-registration requests, the application policy settings on the Functional Component may not be modified. As such, the application policy from the previous subscription or registration operation may remain in effect and unchanged.

A UA can modify the application policy at any time, such as in step 56. For example, if the UA finds a new header in an incoming SIP message that was not previously specified in the application policy and the UA wishes to filter this header out at the Functional Component, the UA can transmit a message to the Functional Component to modify the policy and cause the header to be filtered. A UA may reset the application policy by unsubscribing from the service or issuing a new subscription/registration for the same service. A UA may optionally make use of the Ut interface to convey and provide an indication of application/service policy.

If an application policy setting is modified in a subsequent re-subscription or registration request, the Functional Component may adjust current application policy settings and re-apply them to the UA settings.

The Functional Component may be configured to terminate the application policy (or subscription/registration associated with the policy) at any time, such as in step 58. In that case, the Functional Component may be configured to notify the UA about the status change in step 60. The notification can be delivered to the UA by a SIP NOTIFY message or other means.

The application policy can be stored in a remote database and accessed by the Functional Component as needed. The application policy stored in the remote database may be referenced using URIs contained in SIP messages.

The present system is compatible with existing IMS network components. As a general rule, a SIP message parser may be configured to reject a SIP message with an unsupported payload type or unknown event (e.g. if the payload is required to be understood). Accordingly, if an S-CSCF or other Functional Component that is not configured to implement the present system receives a SIP SUBSCRIBE request including identifying or describing an application policy (e.g., by including the "header-management" event), the request may be rejected using a SIP "489 Bad Event" response to indicate that the specified feature is not understood or supported. In that case, the reject code, along with the indication of which event type is rejected, may trigger the UA to operate in a mode that does not depend on regulation. Alternatively, an option-tag may be defined causing similar behavior, or a SIP message with status set to 415 and an absence of the content-type in the Accept header field may provide the corresponding response or trigger.

Figure 3:
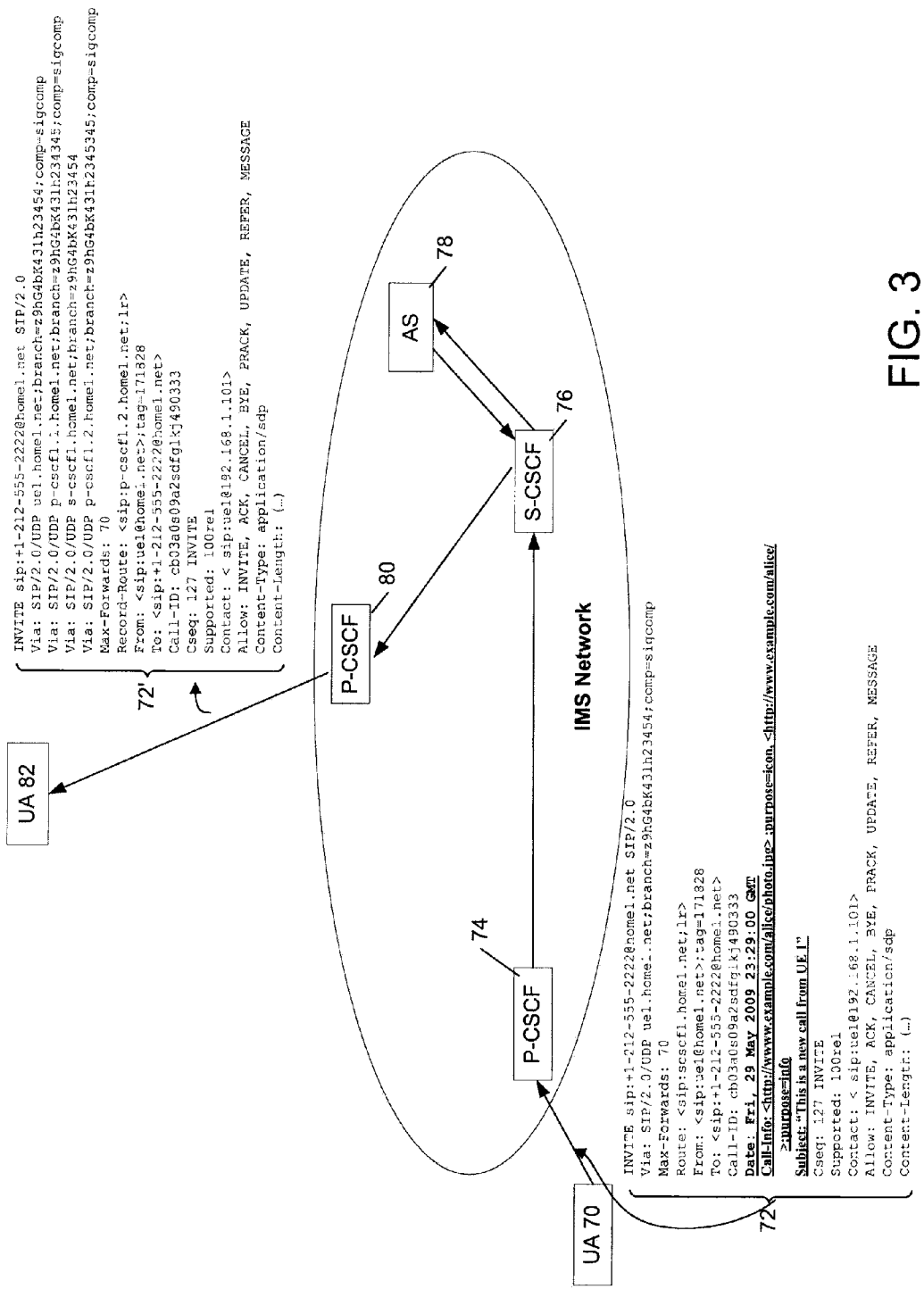
FIG. 3 is an illustration of a UA receiving a message wherein optional headers have been removed in accordance with an application policy.

FIG. 3 is an illustration of a UA receiving a message wherein optional headers have been removed in accordance with an application policy. With reference to FIG. 3, in a first step, UA 70 sends message 72 with a destination of UA 82 to P-CSCF 74. Message 72 includes several optional headers (see underlined text) that are related to applications or services that are supported by UA 70. UA 82, however, does not support the necessary applications or services and, as such, cannot use the optional headers transmitted by UA 72. Prior to the transmission illustrated in FIG. 3, UA 82 has provided an application policy to AS 78 that indicates any such optional headers are to be removed.

P-CSCF 74, after receiving message 72, transmits message 72 to S-CSCF 76. At this point message 72 includes the optional headers. S-CSCF 76 forwards message 72 to a Functional Component (e.g. Application Server 78) that applies the associated application policy settings for the destination address of UA 82 to the message. After applying the application policy, the optional headers that match the application policy criteria are removed from message 72. Application Server 78 then sends the processed message to S-CSCF 76. S-CSCF 76 forwards the message to P-CSCF 80. P-CSCF 80 ultimately forward the modified message 72' to UA 82. UA 82 receives the modified message and processes the message normally. Because, upon processing by UA 82, message 72' does not include the header information unusable by UA 82, UA 82 is not required to process additional, unusable information resulting in more efficient processing. In some cases, the modified message may be transmitted as an I1 message. Furthermore, the original message may be received using a first transport mechanism, and the modified message may be transmitted using a second transmit mechanism. The transport mechanisms may include, for example, short messaging service (SMS) and an unstructured supplementary services data (USSD).

Table 4 provides an illustration of a UA directive that may be incorporated into an application policy. The directive in the example includes the following two values: user and service-id. The first user part of the policy along with the corresponding parameters may be applied to all messages that addressed to the user sip:bob@examples.org, for example. The second service-id part of the policy may be applied to all messages of a certain service id (e.g. urn:urn-7:3gpp-service.ims.icsi.mmtel). The directive may be transmitted as part of a SIP SUBSCRIBE message and may instruct an IMS Functional Component to remove SIP Subject and History-Info headers from incoming SIP INVITE requests and SIP Date header from outgoing SIP 200 OK responses to a SIP INVITE request.

TABLE 4

App-Policy: user; userId="sip:bob@examples.org"; message="INVITE"; action=remove; direction=incoming; header="Subject, History-Info", service-id: +g.3gpp.icsi-ref="urn:urn-7:3gpp-service.ims.icsi.mmtel"; message="200/INVITE"; action=remove; direction=outgoing; header="Date"

Table 5 provides an illustration of a UA directive that may be incorporated as part of an incoming SIP REGISTER message that instructs an IMS Functional Component to remove the SIP Date header from SIP INVITE and SIP BYE requests. The policy may be applied to all users.

TABLE 5

App-Policy: user="*";message="INVITE, BYE"; action=remove; direction=incoming; header="Date"

Table 6 provides an example of an application policy. The policy consists of three different rules. The first rule instructs an IMS Functional Component to allow (unmodified) any incoming SIP INVITE or 200 OK for SIP INVITE that related to a specific user id, for example: sip:bob@example.com. The second rule instructs an IMS Functional Component to remove SIP Data and Subject headers from all SIP messages except those from domain example.org. The third rule instructs an IMS Functional Component to remove SIP User-Agent headers from SIP INVITE, REGISTER, SUBSCRIBE and NOTIFY requests. Depending upon the implementation, a UA may reference these policies directly, for example, by referencing applicable rule identifier(s) within a ruleset or by using an applicable indicator that an application policy of a given type is to be applied.

TABLE 6

```
<?xml version="1.0" encoding="UTF-8" ?>
<!-- application policy
-->
    <ruleset xmlns="urn:ietf:params:xml:ns:common-policy"
xmlns:shp="urn:3gpp:xml:ns:sip-header-policy-ext:1.0"
xmlns:xsi="http://www.w3.org/2001/XMLSchema-instance"
xsi:schemaLocation="urn:ietf:params:xml:ns:common-policy
common-policy.xsd
urn:3gpp:xml:ns:sip-header-policy-ext:1.0 PolicySchema.xsd">
    <!--
        Rule which allows (unmodified) any incoming SIP
INVITE/200OK message/responses related to Bob's work user id
    -->
    <rule id="f3g44r1">
    <conditions>
    <identity>
    <one id="sip:bob@example.com" />
    </identity>
    <sphere value="work" />
    <shp:filter sip-message="INVITE" direction="incoming" />
    <shp:filter sip-message="200/INVITE" direction="incoming" />
    </conditions>
    <actions>
    <shp:allow-header />
    </actions>
    <transformations>
    <shp:header field="*" />
    </transformations>
    </rule>
    <!--
        Rule which removes (Date/Subject field) on any SIP messages
from anyone except those
        from domain 'example.org'.
    -->
    <rule id="f3g44r9">
    <conditions>
    <identity>
    <many>
    <except domain="example.org" />
    </many>
    </identity>
    <shp:filter sip-message="*" direction="bidirectional" />
    </conditions>
    <actions>
    <shp:remove-header />
    </actions>
    <transformations>
    <shp:header field="Date" />
    <shp:header field="Subject" />
    </transformations>
    </rule>
    <!--
        Rule which removes (User-Agent field) from any SIP messages
of the type listed.
    -->
    <rule id="f3g44ra">
    <conditions>
    <shp:filter
sip-message="INVITE|REGISTER|SUBSCRIBE|NOTIFY"
direction="bidirectional" />
    </conditions>
    <actions>
    <shp:remove-header />
    </actions>
    <transformations>
    <shp:header field="User-Agent" />
    </transformations>
    </rule>
    </ruleset>
```

Depending upon the system implementation, various messaging methods may be used by a UA to transmit an application policy to an IMS Functional Component. For example, SIP OPTIONS (or MESSAGE or INFO) methods may be used to transmit the application policy information to the IMS network. After receiving the policy, the Functional Component may indicate the actual application policy status in response to a SIP OPTIONS message.

The SIP OPTIONS request may contain either the application policy in the body or a URI of a file containing the application policy. If including a URI, the SIP OPTIONS message may use the mechanism specified for Content Indirection defined in IETF RFC 4483 when transmitting the SIP OPTIONS message to the Functional Component. When using SIP OPTIONS to transmit the application policy, the UA may also use the SIP Push Capability negotiation mechanism using SIP OPTIONS defined in OMA-TS-SIP_Push-V1_0-20081202-C.

Alternatively, the Functional component may be configured to send the UA a SIP OPTIONS request and the application policy could be returned by the UA in the body of the SIP 200 OK response. Alternatively, the SIP 200 OK response could include a URI of file containing an application policy. Alternatively, SIP PUBLISH methods may be used to convey or indicate the application policy information to one or more components within the IMS network. To receive notifications including the actual policy status, the UA may choose to initiate a following SIP subscription to the Functional Component. For example, a UA may send the application policy in a SIP PUBLISH request. After transmitting the SIP PUBLISH request, the UA is not aware whether all sections of the policy were applied successfully, or only subsets of the policy. In that case, the UA may initiate a SIP SUBSCRIBE request to the Functional Component. The request indicates that the UA wishes to subscribe to information about the policy status. In response, the Functional component accepts the subscription and sends a notification including the status of the actual application policy.

Message session relay protocol (MSRP) may also be used to convey or indicate the application policy information to the IMS network. A UA may initiate an MSRP session to the Functional Component by means of a SIP INVITE request. The Functional Component may then accept the request by transmitting a 200 OK SIP response. After receiving the response, the UA may confirm receipt of the 200 OK response by transmitting a SIP ACK request. SIP INVITE and 200 OK messages may carry MSRP capability information for a corresponding UA and Functional Component. After the SIP session is established, the UA may send the application policy to the Functional Component using MSRP. The Functional Component may then use the same MSRP transport to provide the UA with the actual current status of the application policy. The application policy file to be transferred via MSRP can be negotiated using SDP using the mechanism defined in IETF RFC 5547 A Session Description Protocol (SDP) Offer/Answer Mechanism to Enable File Transfer, for example.

Alternatively, the UA may transmit a SIP REFER request containing a Refer-To header containing a URI (for example an HTTP URI) of a file containing an application policy to the Functional Component. When the Functional Component receives the SIP REFER request, the Functional Component may access the resource (e.g., the file containing the application policy) indicated by the URI in the Refer-To header. A SIP NOTIFY request may then be sent in response to the SIP REFER request after the file containing the application policy is successfully retrieved. The SIP NOTIFY request can contain the application policy as accepted by the Functional Component allowing the UA to determine whether the application policy is in full effect, or whether only portions of the application policy are in effect.

In another implementation of the present system, the application policy may be provisioned by first storing the application policy within an HSS. A Functional Component may then retrieve the application policy and apply the policy to SIP messages. The application policy can be incorporated as part of the user or application profile data on an HSS. For example, the HSS user or application profile may contain the application policy settings for the optional and/or routing headers. If a UA wishes to provision an application provided via an HSS, one possible response to such a request may contain a resulting status of the applied or provisioned application policy (or the policy's parts), such as "applied successfully", "failed", "unknown", etc.

When the Functional Component (e.g. Application Server or S-CSCF) receives a SIP message that is addressed to the UA, the Functional Component can then retrieve or fetch the user or application information including the application policy from the user's profile and apply the applicable filter to the SIP message in accordance with the application policy and UA settings.

After the application policy is applied to the UA settings, the Functional Component may use the policy while parsing SIP messages that are addressed to the UA or, alternatively, received from the UA. If the Functional Component receives a message that is addressed to the UA and the message contains optional and/or routing headers that match the application policy criteria, the Functional Component may remove the headers from the message. Alternatively, the Functional Component may add headers to messages that are proxied from the UA to the network.

In one implementation the filter contains default behavior to allow or, alternatively, to remove all header fields that are not explicitly specified by another filter criteria. The specific filter criteria can specify one or more header fields to be allowed, to be forwarded, to be removed, to be added or to have their contents modified in the forwarded SIP message. The filter can have a direction condition that specifies whether the filter applies to outgoing SIP messages (e.g., UA to the network), incoming SIP messages (e.g., network to the UA) or bidirectional (e.g., both incoming and outgoing SIP messages). The filter may additionally contain conditions that specify which SIP Methods or SIP response codes to which the filter is applied. Other implementations may also contain additional conditions to be applied such as the identity of the user, or the identity of the device that the SIP message is from or destined to, the IMS Communication Service Identifier (ICSI) for the service that the SIP message is related to, the IMS Application Reference Identifier (IARI) for the application that the SIP message is related to and other conditions that restrict the set of SIP messages to which the filter applies. After applying the filter, the ordering of one or more of the headers contained in the modified message may be changed. For example, the headers may be reordered to ensure that particular headers are processed earlier than others, possibly resulting in more efficient processing.

After retrieval of the application policy and the policy is applied to the UA settings, the application policy may be cached on the Functional Component. After caching, the application policy may be periodically updated by the HSS as required. Alternatively, the Functional Component can periodically fetch the application policy from the HSS. The UA may control the application policy settings on HSS. Generally, an HSS administrator is responsible for establishing a set of authorization rules to access and update the policy.

Figure 4:
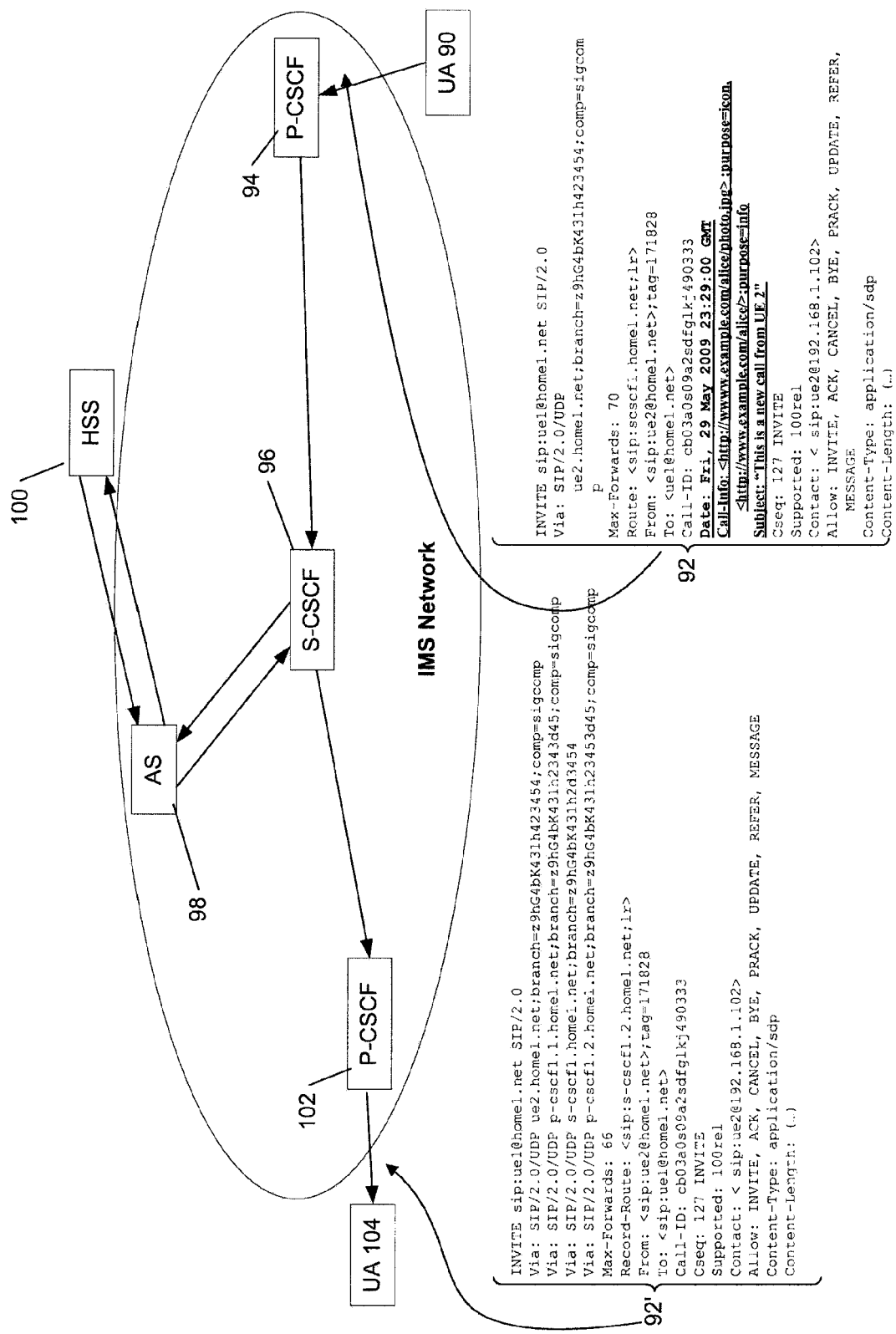
FIG. 4 is an illustration of a UA receiving a message wherein optional headers have been removed in accordance with an application policy and the application policy is provided by a home subscriber server (HSS)

FIG. 4 is an illustration of a UA receiving a message wherein optional headers have been removed in accordance with an application policy and the application policy is provided by an HSS. With reference to FIG. 4, in a first step, UA 90 initiates a call by means of SIP INVITE message 92. Message 92 includes three optional headers: Date, Call-Info and Subject (underlined in FIG. 4). After receiving message 92, P-CSCF 94 processes the request and sends it to S-CSCF 96. S-CSCF 96 receives and processes the request and transmits the request (including message 92 including the option headers) to Application Server 98. Application Server 98 determines that message 92 is addressed to UA 104, and retrieves the application policy settings for UA 104 from HSS 100. Alternatively, HSS 100 may pre-provision Application Server 98 with the application policy settings.

After receiving the application policy for UA 104, Application Server 98 applies the UA 104 application policy settings to message 92 including the SIP INVITE request and removes the optional headers in accordance with UA 104's application policy. After modifying message 92, Application Server sends the modified message 92' to S-CSCF 96, which forwards the modified message 92' to P-CSCF 102 for delivery to UA 104. After receipt, P-CSCF 102 sends the modified message 92' to UA 104. As shown on FIG. 4, modified message 92' does not include the optional headers originally included in message 92 by UA 90.

In some implementations, portions of the application policy may be provided both by an HSS and the UA itself. In that case, control over the application policies can be shared between the UA, the HSS, and other components of the network, or any combination thereof. For example, an operator can choose to delegate control over application specific policies (e.g., mmtel) to the UA while retaining control of the routing application policies (e.g., Via, Record-Route, Route).

Generally, when implementing an application policy, the system may be configured to provide that any particular application policy does not result in messaging/message-dialogue inconsistencies or application/service inconsistencies. If such inconsistencies are suspected of occurring, an IMS Functional Component may ignore those application policy settings considered to be responsible for the inconsistencies. Also, Functional Components may be configured to discard any unknown or inapplicable application policy settings. The system may also be configured to monitor the application policies in effect at both IMS entities such as a UA and an IMS Functional Component to ensure that both the UA and IMS Functional Component possess logically equivalent application policies for use in SIP message header regulation.

In various implementations of the present system, the UA may provision the application policy when transmitting a SIP REGISTER request to the network. For example, the SIP REGISTER request may include an App-Policy header field containing the application policies to be applied by the network to header fields of SIP requests and SIP responses. The network may indicate the status of the applied policies in the 200 OK response to the REGISTER request. The response may contain App-Policy header fields containing application policies that are to be applied by the network to SIP header fields in SIP requests and responses from the UA.

Alternatively, a SIP SUBSCRIBE request may include an App-Policy header field containing the application policies to be applied by the network to header fields of incoming SIP requests and SIP responses. In that case, upon receipt of a 2xx response to the SUBSCRIBE request, the UA may store the information for the established dialog and the expiration time as indicated in the Expires header field of the received response. If the 200 OK response to the SUBSCRIBE request contains App-Policy header fields containing outgoing application policies to be applied by the UA to SIP header fields in outgoing SIP requests and responses, the UA may apply these outgoing policies to SIP header fields of all outgoing SIP requests and responses. The network may indicate the status of the applied policies in the 200 OK response to the REGISTER request. The response may contain App-Policy header fields containing application policies that are to be applied by the network to SIP header fields in SIP requests and responses from the UA.

Alternatively, a SIP REGISTER request may include a Content-Type header field containing the MIME type "application/3gpp-header-management+xml", and a MIME body containing the application policies to be applied by the network to header fields of incoming SIP requests and SIP responses. In that case, if the content of the 3GPP header-management document is large, alternative mechanisms (e.g., the mechanism described in [RFC4483]) may be used to transfer the 3GPP header-management document using the REGISTER request. Upon receiving the 200 (OK) response to the register request, the UA may, if the 200 OK response to the REGISTER request contains a Content-Type header field containing the MIME type "application/3gpp-header-management+xml" and a MIME body containing outgoing application policies to be applied by the UA to SIP header fields in outgoing SIP requests and responses, apply these outgoing policies to SIP header fields of all outgoing SIP requests and responses. The network may indicate the status of the applied policies in the 200 OK response to the REGISTER request. The response may contain App-Policy header fields containing application policies that are to be applied by the network to SIP header fields in SIP requests and responses from the UA.

Alternatively, a SIP SUBSCRIBE message may include a Content-Type header field containing the MIME type "application/3gpp-header-management+xml" and a MIME body containing the application policies to be applied by the network to header fields of incoming SIP requests and SIP responses. In that case, upon receiving a 2xx response to the SUBSCRIBE request, the UA may, if the 200 OK response to the REGISTER request contains a Content-Type header field containing the MIME type "application/3gpp-header-management+xml" and a MIME body containing outgoing application policies to be applied by the UA to SIP header fields in outgoing SIP requests and responses, apply these outgoing policies to SIP header fields of all outgoing SIP requests and responses.

In the present system, when uploading an application policy, a UA may generate a PUBLISH request. The PUBLISH request may include the following header fields. A Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, an Event header field set to the "3gpp-header-management" event package, an Expires header field set to 600 000 seconds as the value desired for the duration of the publication, a Content-Type header field containing the MIME type "application/3gpp-header-management+xml", and a message body containing a 3GPP header-management application policy document containing the application policies to be applied by the network to header fields of incoming SIP requests and SIP responses. Upon receipt of a 2xx message to the PUBLISH request, the UA may SUBSCRIBE to the "3gpp-header-management" event package by generating a SUBSCRIBE request and may populate the header fields as follows: a Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, an Event header field set to the "3gpp-header-management" event package, and an Expires header field set to 600 000 seconds as the value desired for the duration of the subscription. Note that at any time, the UA can receive a NOTIFY request carrying information related to the 3gpp-header-management event package. Upon receipt of a NOTIFY request on the dialog generated during subscription to the 3gpp header-management document event package, the UA may store the application policies from the network contained in the body of the NOTIFY request. If the application policies contains outgoing application policies to be applied by the UA to SIP header fields in outgoing SIP requests and responses, the UA may apply these outgoing policies to SIP header fields of all outgoing SIP requests and responses.

Alternatively, when uploading an application policy, a UA may, upon receipt of a 2xx response to a REGISTRATION message, upload application policies for filtering of SIP header fields as follows. The UA may generate a REFER request having the following header fields: a Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, and a Refer-To header field containing a HTTP URI pointing to a 3GPP header-management document containing the application policies to be applied by the network to header fields of incoming SIP requests and SIP responses. Note that the 3GPP header-management document could be stored on the UA or in a database accessible to the network. Upon receipt of a NOTIFY request on the dialog which was generated as a result of sending the REFER request, the UA may store the application policies from the network contained in the body of the NOTIFY. If the application policies contains outgoing application policies to be applied by the UA to SIP header fields in outgoing SIP requests and responses the UA may apply these outgoing policies to SIP header fields of all outgoing SIP requests and responses.

Alternatively, when uploading an application policy, a UA may, upon receipt of a 2xx response to a REGISTRATION message, upload application policies for filtering of SIP header fields as follows. The UA may create a file "UE-Appl-Pol-Header-Mgmt.xml" containing an encoded 3GPP header-management document containing the application policies to be applied by the network to header fields of incoming SIP requests and SIP responses. The UA may generate an INVITE request as per RFC5547 and may populate the header fields as follows. A Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, and an SDP body containing SDP as defined in RFC5547 including a file selector attribute with the "name" selector set to "UE-Appl-Pol-Header-Mgmt.xml" and the with the "type" selector set to the MIME type "application/3gpp-header-management+xml". Upon receipt of a 2xx response to the INVITE request the UA may establish a session for file transfer as specified in RFC5547, and RFC4975 MSRP and then transfer the file "UE-Appl-Pol-Header-Mgmt.xml" containing the 3GPP header-management document using MSRP as specified in RFC5547 and RFC4975 (MSRP) and receive a file "NW-Appl-Pol-Header-Mgmt.xml" containing a 3GPP header-management document offered by the network. The UA may store the application policies from the network received using MSRPin the file"NW-Appl-Pol-Header-Mgmt.xml". If the received application policies contains outgoing application policies to be applied by the UA to SIP header fields in outgoing SIP requests and responses the UA may apply these outgoing policies to SIP header fields of all outgoing SIP requests and responses.

Alternatively, when uploading an application policy, a UA may, upon receipt of a 2xx response to a registration, upload application policies for filtering of SIP header fields as follows. The UA may generate a MESSAGE request as per RFC3428 and may populate the header fields as follows. A Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, a Content-Type header field containing the MIME type "application/3gpp-header-management+xml", and a message body containing a 3GPP header-management document containing the application policies to be applied by the network to header fields of incoming SIP requests and SIP responses. Note that if the content of the 3GPP header-management document is large the mechanism in RFC4483 may be used to transfer the 3GPP header-management document using the MESSAGE request. Upon receipt of a MESSAGE request containing a Content-Type header field containing the MIME type "application/3gpp-header-management+xml" the UA may store the application policies received from the network contained in the body of the MESSAGE request. If the application policies contain outgoing application policies to be applied by the UA to SIP header fields in outgoing SIP requests and responses the UA may apply these outgoing policies to SIP header fields of all outgoing SIP requests and responses.

Alternatively, when uploading an application policy, a UA may, upon receipt of a 2xx response to a registration, upload application policies for filtering of SIP header fields as follows. The UA may generate an INFO request and may populate the header fields as follows. A Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, an Info-Package header field set to the "3gpp-header-management" info package, and a message body containing a 3GPP header-management document containing the application policies to be applied by the network to header fields of incoming SIP requests and SIP responses. If the content of the 3GPP header-management document is large the mechanism in RFC4483 may be used to transfer the 3GPP header-management document using the INFO request. Upon receipt of an INFO request containing an Info-Package header field containing the "3gpp-header-management" info package, the UA may store the application policies received from the network contained in the body of the INFO request. If the application policies contains outgoing application policies to be applied by the UA to SIP header fields in outgoing SIP requests and responses the UA may apply these outgoing policies to SIP header fields of all outgoing SIP requests and responses.

Alternatively, when uploading an application policy, a UA may, upon receipt of a 2xx response to a registration, upload application policies for filtering of SIP header fields as follows. The UA may generate an OPTIONS request as per RFC3261 and may populate the header fields as follows. A Request-URI set to the a SIP URI that contains the public user identity of the user for which the application policy applies, a From header field set to a SIP URI that contains the public user identity of the user for which the application policy applies, a To header field set to a SIP URI that contains the public user identity of the user for which the application policy applies, a Content-Type header field containing the MIME type "application/3gpp-header-management+xml", and a message body containing a 3GPP header-management document containing the application policies to be applied by the network to header fields of incoming SIP requests and SIP responses. If the content of the 3GPP header-management document is large the mechanism in RFC4483 may be used to transfer the 3GPP header-management document using the OPTIONS request. Upon receipt of a 200 OK response to the OPTIONS containing a Content-Type header field containing the MIME type "application/3gpp-header-management+xml" the UA may store the application policies received from the network contained in the body of the 200 OK response. If the application policies contain outgoing application policies to be applied by the UA to SIP header fields in outgoing SIP requests and responses the UA shall apply these outgoing policies to SIP header fields of all outgoing SIP requests and responses.

After the application policy is provisioned by the UA, one or more network components may retrieve the application policy, execute the application and/or transmit the application policy to other network components. For example, if the REGISTER request contains an App-Policy header field the S-CSCF may extract the UA application policy for filtering SIP headers from the App-Policy header field and deliver this application policy to the HSS using the S-CSCF Registration/deregistration notification procedure with the HSS. Alternatively, if the SUBSCRIBE request contains an App-Policy header field the S-CSCF may extract the UA application policy for filtering SIP headers from the App-Policy header field and deliver this application policy to the HSS using the S-CSCF application policy notification procedure with the HSS. Alternatively, if the REGISTER request contains a Content-Type header field containing the MIME type "application/3gpp-header-management+xml" the S-CSCF may extract the UA application policy for filtering SIP headers from the MIME body of the REGISTER request and deliver this application policy to the HSS using the S-CSCF Registration/deregistration notification procedure with the HSS. In response, the S-CSCF may receive the application policies to be applied by the network. If the content of the 3GPP header-management document is large the mechanism in RFC4483 may be used to transfer the 3GPP header-management document using the REGISTER request. Alternatively, if the SUBSCRIBE request contains a Content-Type header field containing the MIME type "application/3gpp-header-management+xml" the S-CSCF may extract the UA application policy for filtering SIP headers from the MIME body of the SUBSCRIBE request and deliver this application policy to the HSS using the S-CSCF application policy notification procedure with the HSS. In response, the S-CSCF may receive the application policies to be applied by the network. If the content of the 3GPP header-management document is large the mechanism in RFC4483 may be used to transfer the 3GPP header-management document using the SUBSCRIBE request.

In the present system, the AS may retrieve or receive notifications regarding an update of application policy data on the Sh interface from the HSS using the Application Policies notification procedure as described in 3GPP TS 29.328. The application policy may be applied by the network to header fields of incoming SIP requests and SIP responses. Note that the application or service policy may be cached by the AS and periodically updated by the AS if required. Alternatively, the AS may periodically fetch the policy directly from the HSS. Upon receipt of a PUBLISH request containing an Event header field set to the "3gpp-header-management" event package, a Content-Type header field containing the MIME type "application/3gpp-header-management+xml", and a message body containing a 3GPP header-management document (if the content of the 3GPP header-management document is large the mechanism in RFC4483 may be used to transfer the 3GPP header-management document using the PUBLISH request), the AS may extract the UA application policy for filtering SIP headers from the MIME body of the PUBLISH request. Upon receipt of a SUBSCRIBE request containing an Event header field set to the "3gpp-header-management" event package, the AS may send a NOTIFY request containing an Event header field set to the "3gpp-header-management" event package, a Content-Type header field containing the MIME type "application/3gpp-header-management+xml", and a message body containing a 3GPP header-management document containing the application policies. Note that the application or service policy may be cached by the AS and periodically updated by the AS if required. Alternatively, the AS may periodically fetch the policy directly from the HSS. When application policies change, the AS may update the UA of the new application policies using the NOTIFY request.

Alternatively, the AS may retrieve or receive notifications regarding an update of application policy data on the Sh interface from the HSS using the Application Policies notification procedure as described in 3GPP TS 29.328. The application policy may be applied by the network to header fields of incoming SIP requests and SIP responses. Upon receipt of a REFER request containing a Refer-To header field containing a HTTP URI pointing to a 3GPP header-management document, the AS may obtain the referenced 3GPP header-management document containing the UA application policy for filtering SIP headers using an HTTP GET Method as specified in RFC2616. Note that the 3GPP header-management document could be stored on the UA or in a database accessible by the network. Upon receiving the 3GPP header-management document containing the UA application policy for filtering SIP headers, the AS may send a NOTIFY request containing an Event header field set to the "refer" event package, a Content-Type header field containing the MIME type "application/3gpp-header-management+xml", and a message body containing a 3GPP header-management document containing the application policies. In this example, the application or service policy may be cached by the AS and periodically updated by the AS if required. Alternatively, the AS may periodically fetch the policy directly from the HSS. When application policies change, the AS may update the UA of the new application policies using the NOTIFY request.

Alternatively, the AS may retrieve or receive notifications regarding an update of application policy data on the Sh interface from the HSS using the Application Policies notification procedure as described in 3GPP TS 29.328. The application policy may be applied by the network to header fields of incoming SIP requests and SIP responses. Upon receipt of a MESSAGE request containing a Content-Type header field containing the MIME type "application/3gpp-header-management+xml", and a message body containing a 3GPP header-management document (if the content of the 3GPP header-management document is large the mechanism in RFC4483 may be used to transfer the 3GPP header-management document using the MESSAGE request), the AS may extract the UA application policy for filtering SIP headers from the MIME body of the MESSAGE request. After sending a 200 OK response to the MESSAGE request, the AS may send a MESSAGE request containing a Content-Type header field containing the MIME type "application/3gpp-header-management+xml", and a message body containing a 3GPP header-management document containing the application policies. In this example, the application or service policy may be cached by the AS and periodically updated by the AS if required. Alternatively, the AS may periodically fetch the policy directly from the HSS. When application policies change the AS may update the UA of the new application policies using a MESSAGE request as above.

Alternatively, the AS may retrieve or receive notifications regarding an update of application policy data on the Sh interface from the HSS using the Application Policies notification procedure as described in 3GPP TS 29.328. The application policy may be applied by the network to header fields of incoming SIP requests and SIP responses. Upon receipt of an INFO request containing an Info-Package header field set to the "3gpp-header-management" info package, and a message body containing a 3GPP header-management document containing the application policies to be applied by the network to header fields of incoming SIP requests and SIP responses (if the content of the 3GPP header-management document is large the mechanism in RFC4483 may be used to transfer the 3GPP header-management document using the INFO request), the AS may extract the UA application policy for filtering SIP headers from the MIME body of the INFO request. After sending a 200 OK response to the INFO request the AS may send an INFO request containing an Info-Package header field set to the "3gpp-header-management" info package, and a message body containing a 3GPP header-management document containing the application policies (if the content of the 3GPP header-management document is large the mechanism in RFC4483 may be used to transfer the 3GPP header-management document using the INFO request). In this example, the application or service policy may be cached by the AS and periodically updated by the AS if required. Alternatively, the AS may periodically fetch the policy directly from the HSS. When application policies change the AS may update the UA of the new application policies using the INFO request as above.

Alternatively, the AS may retrieve or receive notifications regarding an update of application policy data on the Sh interface from the HSS using the Application Policies notification procedure as described in 3GPP TS 29.328. The application policy may be applied by the network to header fields of incoming SIP requests and SIP responses. Upon receipt of an INFO request containing a Content-Type header field containing the MIME type "application/3gpp-header-management+xml", and a message body containing a 3GPP header-management document containing the application policies to be applied by the network to header fields of incoming SIP requests and SIP responses (if the content of the 3GPP header-management document is large the mechanism in RFC4483 may be used to transfer the 3GPP header-management document using the OPTIONS request), the AS may extract the UA application policy for filtering SIP headers from the MIME body of the OPTIONS request. After sending a 200 OK response to the OPTIONS request, the AS may send an OPTIONS request containing a Content-Type header field containing the MIME type "application/3gpp-header-management+xml", and a message body containing a 3GPP header-management document containing the application policies (if the content of the 3GPP header-management document is large the mechanism in RFC4483 may be used to transfer the 3GPP header-management document using the OPTIONS request). In this example, the application or service policy may be cached by the AS and periodically updated by the AS if required. Alternatively, the AS may periodically fetch the policy directly from the HSS. When application policies change the AS will update the UA of the new application policies using the OPTIONS request as above.

In this present system, the ICBF of a network may be configured to, if specified by local policy rules or application policies downloaded from the HSS or obtained from the UA, filter (e.g., remove or modify) any received SIP header fields and add SIP header fields prior to forwarding SIP messages. The ICBF may retrieve or receive notifications regarding an update of application policy data on the Ex interface from the HSS using the Application Policies notification procedure as described in 3GPP TS 29.XYZ. The application policy may be applied by the network to header fields of incoming SIP requests and SIP responses. The application or service policy may be cached by the IBCF and periodically updated by the HSS if required. Alternatively, the IBCF may periodically fetch the policy directly from the HSS.

In one implementation of the present system, when the AS, IBCF or other network component has received a 3GPP header-management document containing outgoing application policies to be applied to SIP header fields in SIP requests and responses, the network component may parse SIP messages addressed to or sent by a UA and the message contains SIP message elements matching or otherwise specified by the associated policy then the network component may update the SIP message elements as specified by the policy directives (i.e. modify, add, and/or remove SIP message elements) before forwarding them as follows. If application policies have been obtained both from the UA and the network then the polices from the UA and the network are logically merged together to form a merged application policy document. If there is a conflict between the policies of the network and the policies from the UA the network policies take priority as follows. if UA policy is to explicitly exclude a header and the network policy is to explicitly include a header the header is included, if UA policy is to explicitly include a header and the network policy is to explicitly exclude a header the header is excluded, if the UA policy is explicitly to include a header and the default policy of the network is to exclude a header the header is included, if the default policy of the UA is to exclude a header and the network policy is to explicitly include a header the header is included, if the UA policy is explicitly to exclude a header and the default policy of the network is to include a header the header is excluded, and if the default policy of the UA is to include a header and the network policy is to explicitly exclude a header the header is excluded.

In one implementation of the present system, the application policy is encoded with an XML document. The XML document may have a structure similar to that shown in Table 7.

TABLE 7

```
<?xml version="1.0" encoding="UTF-8"?>
<xs:schema targetNamespace="urn:3gpp:xml:ns:sip-header-policy-ext:1.0"
    xmlns="urn:3gpp:xml:ns:sip-header-policy-ext:1.0"
    xmlns:xs="http://www.w3.org/2001/XMLSchema"
    xmlns:cp="urn:ietf:params:xml:ns:common-policy"
    elementFormDefault="qualified" attributeFormDefault="unqualified">
        <!--
              This import resolves the IETF common policy type definitions.
              NOTE: 'schemaLocation' gives a hint as to where a serialization of a
Â•schema documentÂ•
              with declarations and definitions for that namespace (or none), may be found.
        -->
        <xs:import      namespace="urn:ietf:params:xml:ns:common-policy"
schemaLocation="common-policy.xsd"/>
    <xs:complexType name="headerFilterConditionType">
        <xs:complexContent>
            <xs:extension base="xs:anyType">
                <xs:attribute name="sip-message" type="xs:token" use="required"/>
                    <xs:attribute name="direction" type="xs:token" use="required"/>
            </xs:extension>
        </xs:complexContent>
    </xs:complexType>
    <xs:complexType name="headerFilterTransformationsType">
        <xs:complexContent>
            <xs:extension base="cp:extensibleType">
                <xs:attribute name="field" type="xs:token" use="optional"/>
                    <xs:attribute name="value" type="xs:token" use="optional"/>
            </xs:extension>
        </xs:complexContent>
    </xs:complexType>
    <!-- SIP header policy extension 'conditions' element... -->
    <xs:element name="filter" type="headerFilterConditionType"/>
    <!-- SIP header policy extension 'actions' element... -->
    <xs:element name="allow-header" type="cp:extensibleType"/>
        <xs:element name="remove-header" type="cp:extensibleType"/>
        <xs:element name="add-header"    type="cp:extensibleType"/>
        <xs:element name="modify-header" type="cp:extensibleType"/>
    <!-- SIP header policy extension 'transformations' element... -->
    <xs:element name="header" type="headerFilterTransformationsType"/>
</xs:schema>
```

Referring to Table 7, the XML schema used to encode the application policy may include the following elements. The <allow-header> element is an element that can optionally appear within <actions> element. The <allow-header> element specifies that header fields of SIP requests and responses matching the conditions are to be forwarded unmodified. The <allow-header> element must contain one "direction" attribute. The <remove-header> element is an element that can optionally appear within <actions> element. The <remove-header> element specifies that header fields of SIP requests and responses matching the conditions are to be removed prior to forwarding. The <remove-header> element may contain one "direction" attribute. The <add-header> element is an element that can optionally appear within <actions> element. The <add-header> element may specify that header fields are to be added to SIP requests and responses matching the conditions prior to forwarding. The <add-header> element may contain one "direction" attribute. and may contain a "value" attribute. If no "value" attribute is included then the contents of the header field is empty. The <modify-header> element is an element that can optionally appear within <actions> element. The <modify-header> element specifies that header fields of SIP requests and responses matching the conditions are to be modified prior to forwarding. The <modify-header> element may contain one "direction" attribute and may contain a "value" attribute. If no "value" attribute is included, then the contents of the header field are removed. The <header> element is an element that may appear at least once within the <transformations> element. The <header> element specifies the appropriate header fields that are transformed according to the criteria specified by the <actions> element. The following may be allowed values: "incoming", "outgoing" and "bidirectional". The <header> element may contain at least one "field" attribute.

The "sip-message" attribute is a token that is matched to the SIP Method or Response code. For example, a SIP method e.g. "INVITE" or SIP response e.g. "200/INVITE" that corresponds to a 200 OK response to an INVITE request. Wildcard values for all SIP Requests and Responses are specified using the "*" token. The "*" token may be considered a default policy for all messages. The "|" character can be used to delimit multiple SIP requests or responses e.g. "INVITE|SUBSCRIBE". The "direction" attribute" may have the values "incoming", "outgoing", and "bidirectional". The "direction" attribute" may be used with the <filter> elements. The direction attribute specifies whether the action is applied to incoming SIP requests and responses (network to UA), outgoing SIP requests and responses (UA to network), or both incoming and outgoing SIP requests and responses. The "field" attribute identifies the header field to which the transformation applies. The "field" attribute may be used with the <header> element. The "*" token is considered a default policy for all headers that are no explicitly identified. The "value" attribute contains the contents of the header field to replace the current contents of the specified header to which the <modify-header> element applies. The "value" attribute may be used with the <add-header> element and <modify-header> element.

Table 8 illustrates an example application policy encoded in an XML code structure. The policy defines certain actions to allow (unmodified) any incoming SIP INVITE/200OK message/responses related to a particular user's work user id. The policy also includes rules to remove any Date or Subject field on any SIP messages from any users except those from the domain 'example.org'. The policy also includes rules to remove User-Agent fields from any SIP messages of the types including SIP INVITE, REGISTER, SUBSCRIBE, or NOTIFY messages.

TABLE 8

```
<?xml version="1.0" encoding="UTF-8"?>
<!-- application policy -->
<ruleset xmlns="urn:ietf:params:xml:ns:common-policy"
         xmlns:shp="urn:3gpp:xml:ns:sip-header-policy-ext:1.0"
                xmlns:xsi="http://www.w3.org/2001/XMLSchema-instance"
                xsi:schemaLocation="urn:ietf:params:xml:ns:common-policy common-policy.xsd
                                    urn:3gpp:xml:ns:sip-header-policy-ext:1.0
PolicySchema.xsd">
    <!--
            Rule which allows (unmodified) any incoming SIP INVITE/200OK
    message/responses related to Bob's work user id
            -->
    <rule id="f3g44r1">
        <conditions>
                <identity>
                    <one id="sip:bob@example.com"/>
                </identity>
                <sphere value="work"/>
                <shp:filter sip-message="INVITE" direction="incoming"/>
                        <shp:filter sip-message="200/INVITE" direction="incoming"/>
        </conditions>
        <actions>
            <shp:allow-header/>
        </actions>
        <transformations>
            <shp:header field="*"/>
        </transformations>
    </rule>
    <!--
            Rule which removes (Date/Subject field) on any SIP messages from
    anyone except those
            from domain 'example.org'.
            -->
    <rule id="f3g44r9">
        <conditions>
            <identity>
```

TABLE 8-continued

```
                <many>
                        <except domain="example.org"/>
                </many>
            </identity>
            <shp:filter sip-message="*" direction="bidirectional"/>
        </conditions>
        <actions>
            <shp:remove-header/>
        </actions>
        <transformations>
            <shp:header field="Date"/>
            <shp:header field="Subject"/>
        </transformations>
    </rule>
    <!--
        Rule which removes (User-Agent field) from any SIP messages of the type listed.
    -->
    <rule id="f3g44ra">
        <conditions>
            <shp:filter sip-message="INVITE|REGISTER|SUBSCRIBE|NOTIFY" direction="bidirectional"/>
        </conditions>
        <actions>
            <shp:remove-header/>
        </actions>
        <transformations>
            <shp:header field="User-Agent"/>
        </transformations>
    </rule>
</ruleset>
```

Table 9 illustrates an example policy schema to be used in conjunction with the present system. In the illustrated example, the schema is encoded using XML.

TABLE 9

```
<?xml version="1.0" encoding="UTF-8"?>
<xs:schema targetNamespace="urn:3gpp:xml:ns:sip-header-policy-ext:1.0"
    xmlns="urn:3gpp:xml:ns:sip-header-policy-ext:1.0"
    xmlns:xs="http://www.w3.org/2001/XMLSchema"
    xmlns:cp="urn:ietf:params:xml:ns:common-policy"
    elementFormDefault="qualified" attributeFormDefault="unqualified">
    <!--
        This import resolves the IETF common policy type definitions.
        NOTE: 'schemaLocation' gives a hint as to where a serialization of a
    •schema document•
        with declarations and definitions for that namespace (or none), may be found.
    -->
    <xs:import namespace="urn:ietf:params:xml:ns:common-policy" schemaLocation="common-policy.xsd"/>
    <xs:complexType name="headerFilterConditionType">
        <xs:complexContent>
            <xs:extension base="xs:anyType">
                <xs:attribute name="sip-message" type="xs:token" use="required"/>
                <xs:attribute name="direction" type="xs:token" use="required"/>
            </xs:extension>
        </xs:complexContent>
    </xs:complexType>
    <xs:complexType name="headerFilterTransformationsType">
        <xs:complexContent>
            <xs:extension base="cp:extensibleType">
                <xs:attribute name="field" type="xs:token" use="optional"/>
                <xs:attribute name="value" type="xs:token" use="optional"/>
            </xs:extension>
        </xs:complexContent>
    </xs:complexType>
    <!-- SIP header policy extension 'conditions' element... -->
    <xs:element name="filter" type="headerFilterConditionType"/>
    <!-- SIP header policy extension 'actions' element... -->
    <xs:element name="allow-header" type="cp:extensibleType"/>
        <xs:element name="remove-header" type="cp:extensibleType"/>
        <xs:element name="add-header" type="cp:extensibleType"/>
```

TABLE 9-continued

```
        <xs:element name="modify-header" type="cp:extensibleType"/>
    <!-- SIP header policy extension 'transformations' element... -->
    <xs:element name="header" type="headerFilterTransformationsType"/>
</xs:schema>
```

Table 10 illustrates a common application policy that may be used in conjunction with the present system. The common application policy is encoded using XML.

TABLE 10

```
<?xml version="1.0" encoding="UTF-8"?>
<xs:schema targetNamespace="urn:ietf:params:xml:ns:common-policy"
    xmlns:cp="urn:ietf:params:xml:ns:common-policy"
    xmlns:xs="http://www.w3.org/2001/XMLSchema"
    elementFormDefault="qualified" attributeFormDefault="unqualified">
    <!-- /ruleset -->
    <xs:element name="ruleset">
        <xs:complexType>
            <xs:complexContent>
                <xs:restriction base="xs:anyType">
                    <xs:sequence>
                        <xs:element name="rule" type="cp:ruleType"
                        minOccurs="0" maxOccurs="unbounded"/>
                    </xs:sequence>
                </xs:restriction>
            </xs:complexContent>
        </xs:complexType>
    </xs:element>
    <!-- /ruleset/rule -->
    <xs:complexType name="ruleType">
        <xs:complexContent>
            <xs:restriction base="xs:anyType">
                <xs:sequence>
                    <xs:element name="conditions"
                    type="cp:conditionsType" minOccurs="0"/>
                    <xs:element name="actions"
                    type="cp:extensibleType" minOccurs="0"/>
                    <xs:element name="transformations"
                    type="cp:extensibleType" minOccurs="0"/>
                </xs:sequence>
                <xs:attribute name="id" type="xs:ID" use="required"/>
            </xs:restriction>
        </xs:complexContent>
    </xs:complexType>
    <!-- //rule/conditions -->
    <xs:complexType name="conditionsType">
        <xs:complexContent>
            <xs:restriction base="xs:anyType">
                <xs:choice maxOccurs="unbounded">
                    <xs:element name="identity"
                    type="cp:identityType" minOccurs="0"/>
                    <xs:element name="sphere"
                    type="cp:sphereType" minOccurs="0"/>
                    <xs:element name="validity"
                    type="cp:validityType" minOccurs="0"/>
                    <xs:any namespace="##other" processContents="lax"
                    minOccurs="0" maxOccurs="unbounded"/>
                </xs:choice>
            </xs:restriction>
        </xs:complexContent>
    </xs:complexType>
    <!-- //conditions/identity -->
    <xs:complexType name="identityType">
        <xs:complexContent>
            <xs:restriction base="xs:anyType">
                <xs:choice minOccurs="0" maxOccurs="unbounded">
                    <xs:element name="one" type="cp:oneType"/>
                    <xs:element name="many" type="cp:manyType"/>
                    <xs:any namespace="##other" processContents="lax"/>
                </xs:choice>
            </xs:restriction>
        </xs:complexContent>
    </xs:complexType>
    <!-- //identity/one -->
    <xs:complexType name="oneType">
        <xs:complexContent>
```

TABLE 10-continued

```
            <xs:restriction base="xs:anyType">
                <xs:sequence>
                    <xs:any namespace="##other"
                        minOccurs="0" processContents="lax"/>
                </xs:sequence>
                <xs:attribute name="id"
                    type="xs:anyURI" use="required"/>
            </xs:restriction>
        </xs:complexContent>
    </xs:complexType>
    <!-- //identity/many -->
    <xs:complexType name="manyType">
        <xs:complexContent>
            <xs:restriction base="xs:anyType">
                <xs:choice minOccurs="0" maxOccurs="unbounded">
                    <xs:element name="except" type="cp:exceptType"/>
                    <xs:any namespace="##other"
                        minOccurs="0" processContents="lax"/>
                </xs:choice>
                <xs:attribute name="domain"
                    use="optional" type="xs:string"/>
            </xs:restriction>
        </xs:complexContent>
    </xs:complexType>
    <!-- //many/except -->
    <xs:complexType name="exceptType">
        <xs:attribute name="domain" type="xs:string" use="optional"/>
        <xs:attribute name="id" type="xs:anyURI" use="optional"/>
    </xs:complexType>
    <!-- //conditions/sphere -->
    <xs:complexType name="sphereType">
        <xs:complexContent>
            <xs:restriction base="xs:anyType">
                <xs:attribute name="value"
                    type="xs:string" use="required"/>
            </xs:restriction>
        </xs:complexContent>
    </xs:complexType>
    <!-- //conditions/validity -->
    <xs:complexType name="validityType">
        <xs:complexContent>
            <xs:restriction base="xs:anyType">
                <xs:sequence minOccurs="0" maxOccurs="unbounded">
                    <xs:element name="from" type="xs:dateTime"/>
                    <xs:element name="until" type="xs:dateTime"/>
                </xs:sequence>
            </xs:restriction>
        </xs:complexContent>
    </xs:complexType>
    <!-- //rule/actions or //rule/transformations -->
    <xs:complexType name="extensibleType">
        <xs:complexContent>
            <xs: restriction base="xs:anyType">
                <xs:sequence>
                    <xs:any namespace="##other"
                        processContents="lax" minOccurs="0" maxOccurs="unbounded"/>
                </xs:sequence>
            </xs:restriction>
        </xs:complexContent>
    </xs:complexType>
</xs:schema>
```

Figure 5:
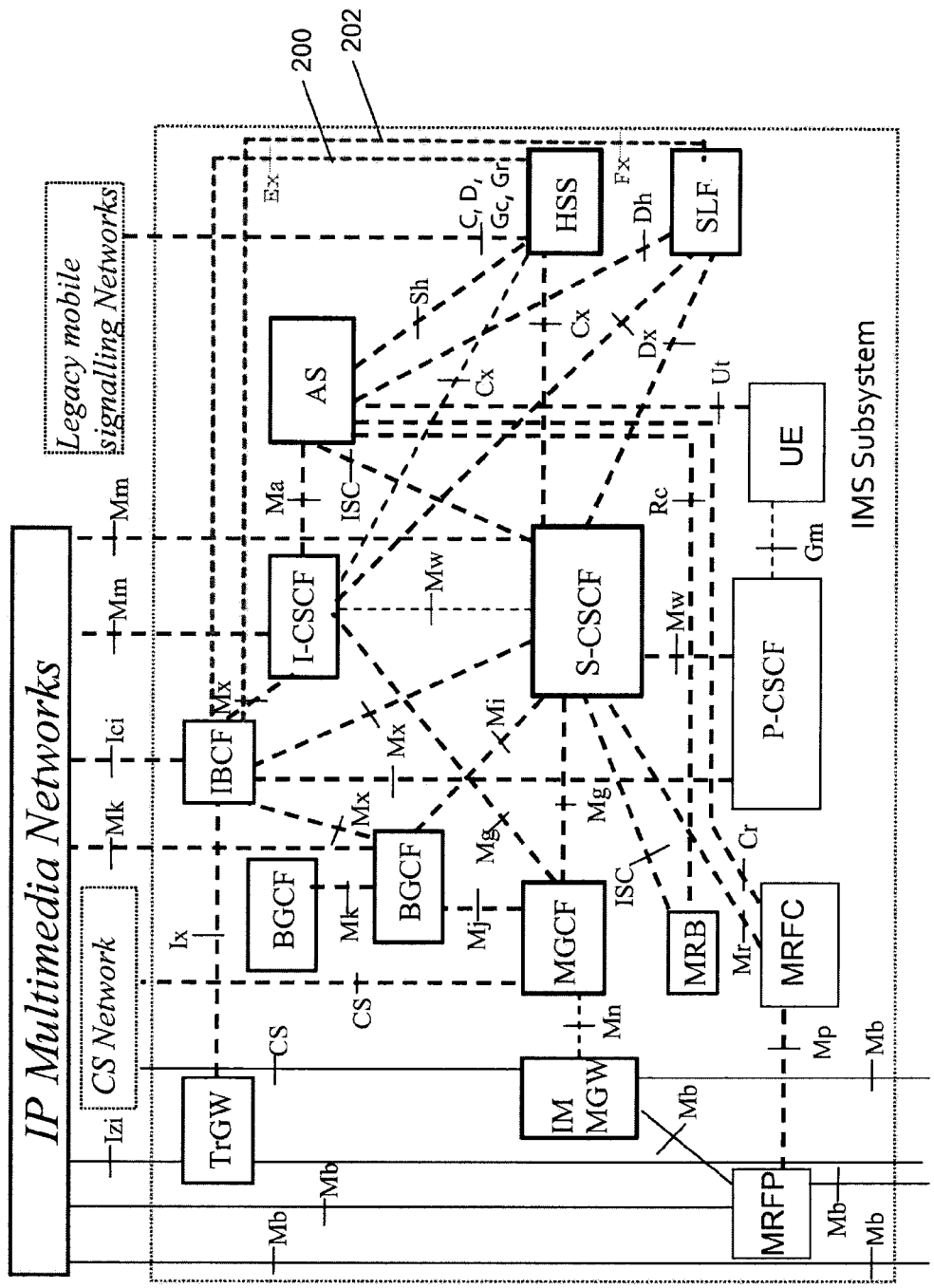
FIG. 5 is an illustration of a system architecture showing how Interconnection Border Control Functions fit into the IMS architecture in the present system.

FIG. 5 is an illustration of a system architecture showing how Border Control Functions fit into the IMS architecture in the present system. FIG. 5 illustrates how the additional interfaces Ex 200 and Fx 202 may be defined to facilitate the distribution and implementation of the application policies of the present disclosure. The Ex interface operates between an HSS and IBCF and the Fx function operates between an Subscription Locator Function (SLF) and IBCF. Based upon operator preference, border control functions may be applied between two IM CN subsystem networks or between an IM CN subsystem network and other SIP based multimedia network. The functions are provided by the IBCF and may include screening SIP signaling information based on source/ destination, operator policy (e.g. remove information that is of local significance to an operator), application/service policy (i.e. associated with one or more UAs), and optionally, for an IBCF located in the home network, policing the IMS Communication Service ID.

In one implementation of the present system, a SLF or a Diameter Proxy Agent may be used to find the address of the HSS that holds the subscriber data for a given user identity and any associated application policy data when multiple and separately addressable HSSs have been deployed by the network operator. The SLF may be accessed via the Dx interface, the Fx interface, or the Dh interface. The Dx interface is generally the standard interface between the CSCF and the SLF, the Fx interface is generally the standard interface between the IBCF and the SLF, and the Dh interface is generally the standard interface between the AS and the SLF. The Fx interface may be configured to provide an operation to query the SLF from the IBCF, or a response to provide the HSS name towards the IBCF. By sending the Fx-operation FX_SLF_QUERY, the IBCF may be configured to indicate a Public User Identity of which it is looking for an HSS. By the Fx-operation FX_SLF_RESP the SLF responds with the HSS name. The IBCF may continue by querying the selected HSS. The IBCF may store the HSS name for the subsequent Ex-operations. Note that the interface between the IBCF and SLF may not be required in a single HSS environment. An example for a single HSS environment is a server farm architecture.

In one example, the IBCF queries the SLF to identify the HSS to access by sending a FX_SLF_QUERY to the SLF and including as a parameter the Public User Identity. After receiving the RX_SLF_QUERY, the SLF looks up its database for the queried Public User Identity and answers the query with the HSS name in which the user's subscription data can be found. The IBCF then sends the appropriate Ex message towards the correct HSS.

Figure 6:
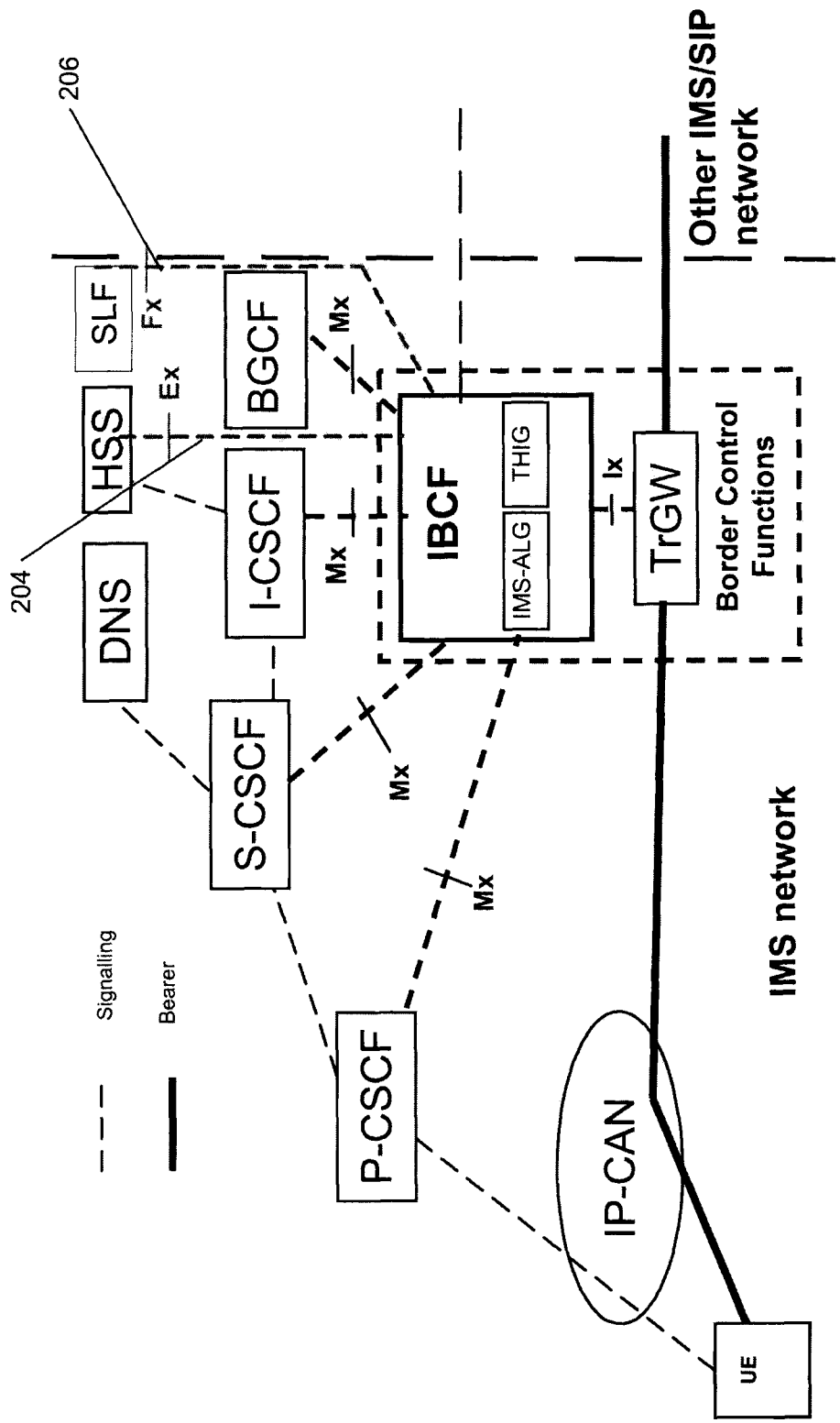
FIG. 6 is an illustration showing additional detail of a system architecture showing how Interconnection Border Control Functions fit into the IMS architecture in the present system.

FIG. 6 is an illustration showing additional detail of a system architecture showing how Border Control Functions fit into the IMS architecture in the present system. With reference to FIG. 6, the Mx reference point allows the S-CSCF/I-CSCF/P-CSCF to communicate with an IBCF to provide border control functions. Ex reference 204 point allows an IBCF to retrieve application/service policy from the HSS and Fx reference point 206 allows an IBCF to resolve the appropriate HSS.

Using the present system in a network configuration such as that illustrated in FIG. 1, in one implementation, the size of the SIP message has been reduced by 22% (or 187 bytes; total message size is 858 bytes). In some cases, the message size may be further reduced as the corresponding application policy becomes more aggressive (e.g., by specifying additional unused or un-needed headers).

Figure 7:
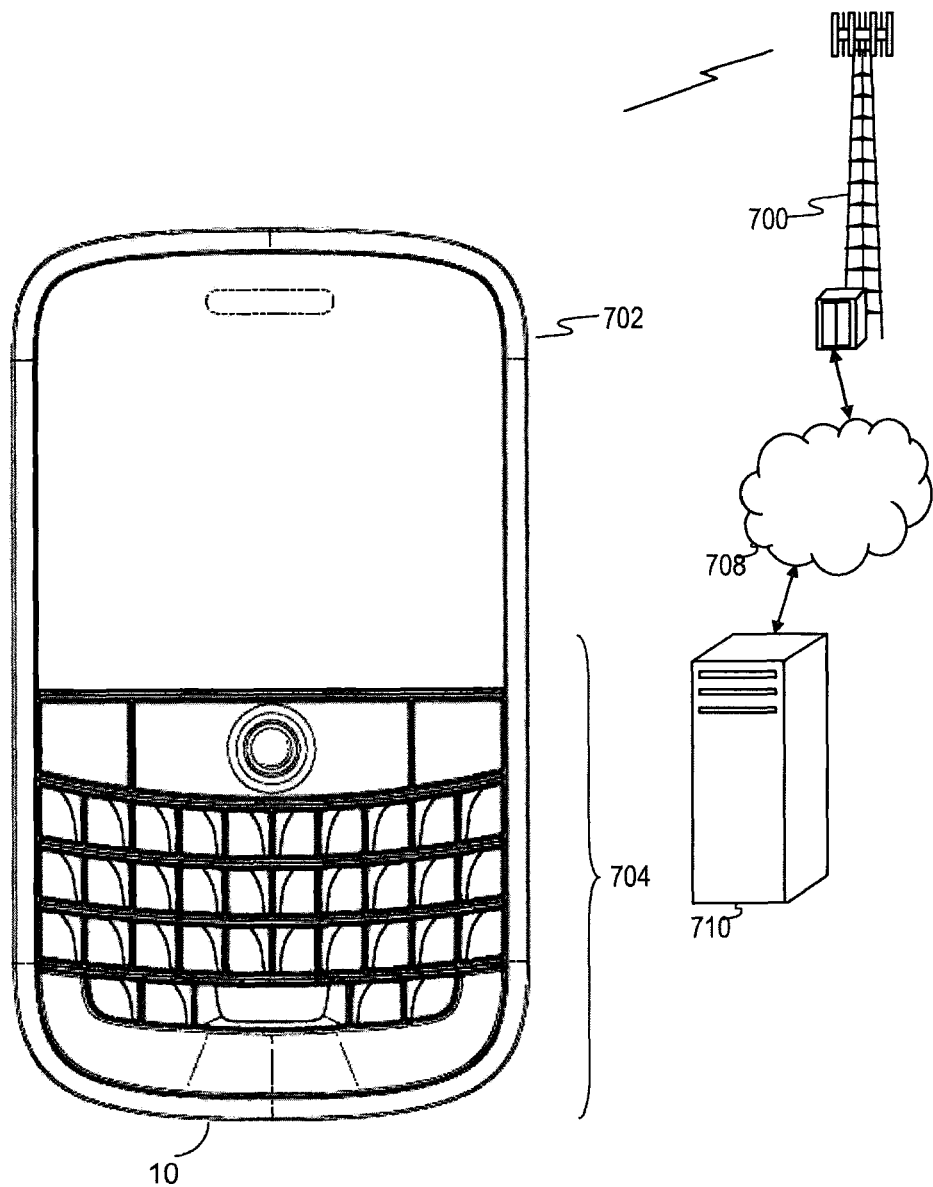
FIG. 7 is a diagram of a wireless communications system including a UA operable for some of the various embodiments of the disclosure.

FIG. 7 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 8:
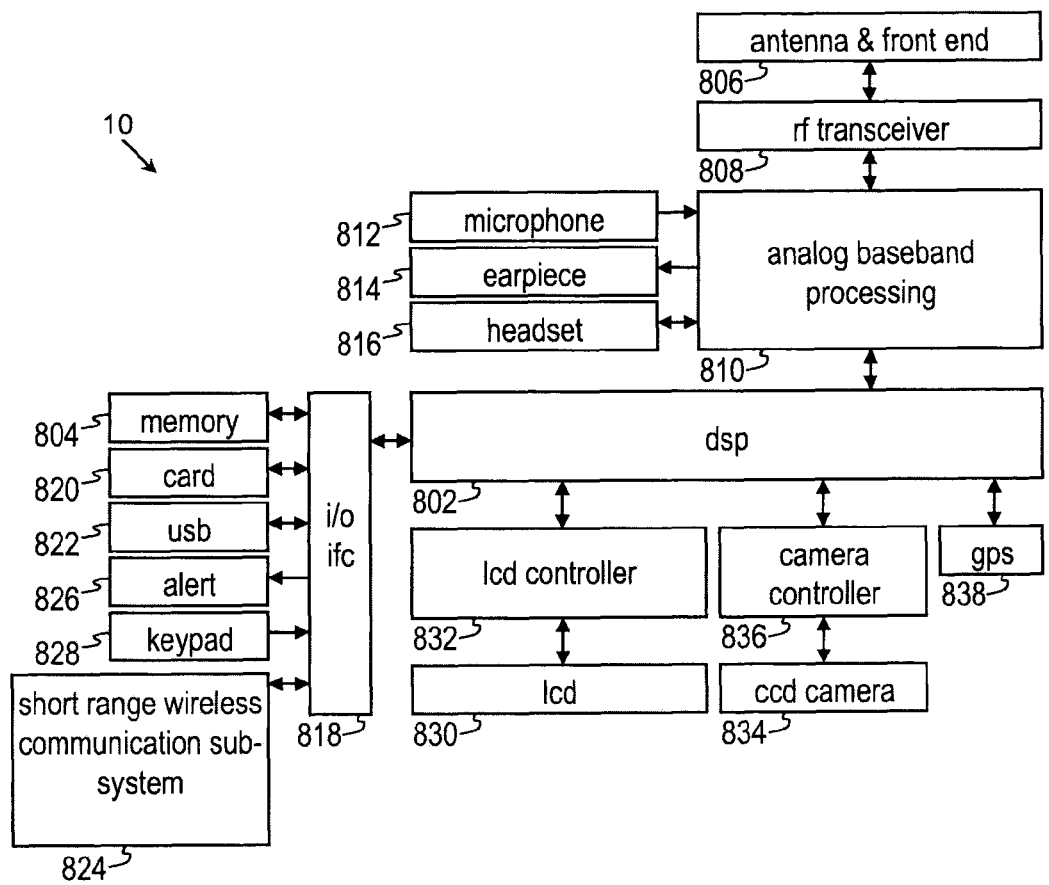
FIG. 8 is a block diagram of a UA operable for some of the various embodiments of the disclosure.

FIG. 8 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 9:
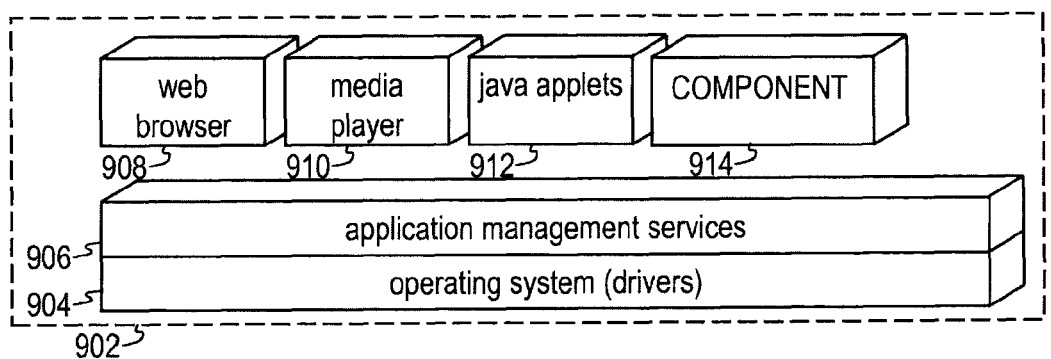
FIG. 9 is a diagram of a software environment that may be implemented on a UA operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 9 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 10:
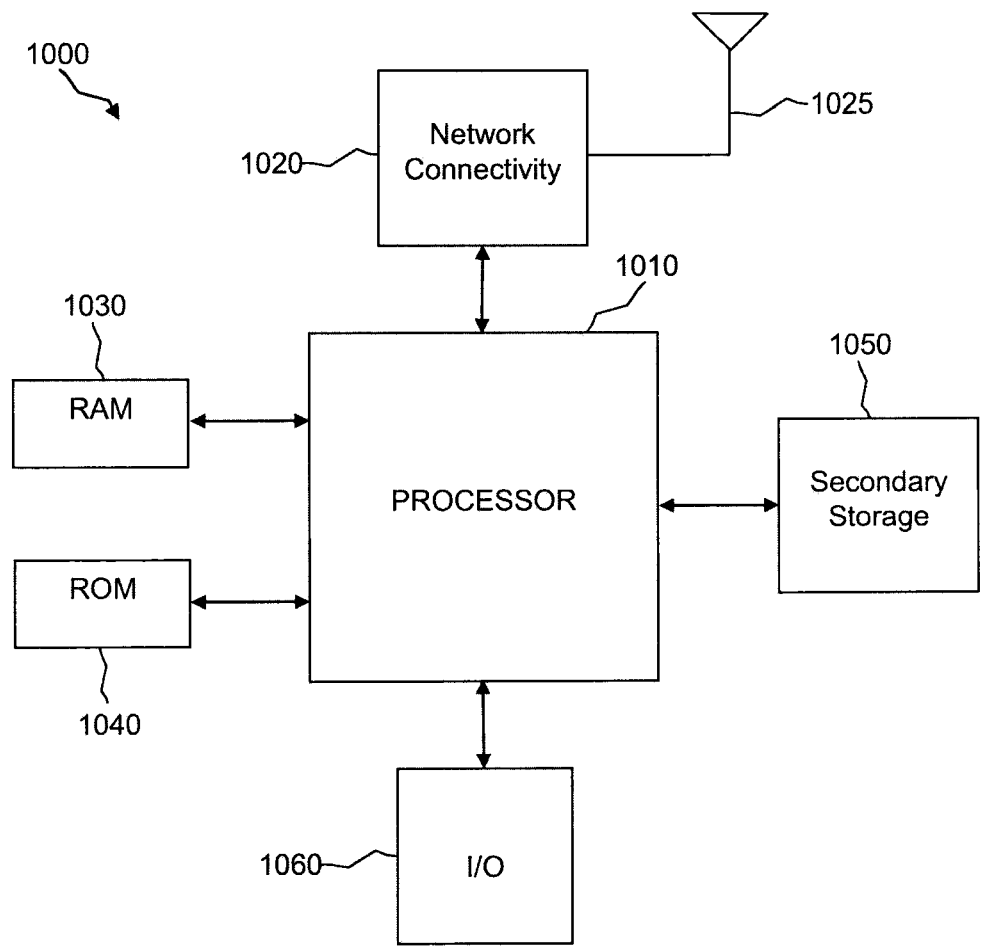
FIG. 10 is an illustrative general purpose computer system suitable for some of the various embodiments of the disclosure.

The UA 10, base station 12, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made:

What is claimed is:

1. A user agent (UA) for communicating with a communications network implementing an internet protocol (IP) multimedia subsystem (IMS), the UA being configured to send and receive session initiation protocol (SIP) messages, the UA comprising:
   a processor, the processor being configured to:
      receive a request for an application policy from a network entity;
      send a message to the network entity in response to the request for the application policy, the message identifying an application policy, and
      receive, from the network entity, status information of an application of the application policy, wherein the status information identifies a first portion of the application policy that was successfully applied and a second portion of the application policy that was not successfully applied.

2. The UA of claim 1, wherein the UA is at least one of a third generation partnership project (3GPP) user equipment, a wireless device, a set-top box, a phone, a computer, and a SIP user agent.

3. The UA of claim 1, wherein the message includes a uniform resource identifier (URI), the URI identifying a location of the application policy within a database.

4. The UA of claim 1, wherein the message contains the application policy.

5. The UA of claim 4, wherein the application policy is encoded using extensible markup language (XML).

6. The UA of claim 1, wherein the message includes at least one of a SIP SUBSCRIBE, a SIP REGISTER, a SIP MESSAGE, a SIP INFO, a SIP OPTION, a SIP PUBLISH, and a SIP REFER request.

7. The UA of claim 1, wherein the message includes a SIP signaling compression (SigComp) transmission.

8. The UA of claim 1, wherein the message includes a message session relay protocol (MSRP) message after a SIP session is established between the UA and a policy provider.

9. The UA of claim 1, wherein the application policy identifies a SIP message header field to remove, and wherein the processor is configured to:
receive a modified SIP message, wherein the SIP message header field identified by the application policy is not included in the modified SIP message.

10. The UA of claim 1, wherein the application policy identifies a SIP message header field to modify, and wherein the processor is configured to:
receive a modified SIP message, wherein the SIP message header field identified by the application policy is modified in accordance with the application policy in the modified SIP message.

11. The UA of claim 1, wherein the application policy identifies a SIP message header field to include, and wherein the processor is configured to:
receive a modified SIP message, wherein the SIP message header field identified by the application policy is included in the modified SIP message.

12. The UA of claim 11, wherein the application policy further identifies an attribute of the at least one of a SIP message header field to include, a SIP message header field to remove, and a SIP message header field to modify, the attribute including at least one of an indication of message direction, an identifier of a service or application, a SIP method name, and a SIP response code.

13. A user agent (UA) for communicating with a communications network implementing an internet protocol (IP) multimedia subsystem (IMS), the UA being configured to send and receive session initiation protocol (SIP) messages, the UA comprising:
a processor, the processor being configured to:
receive, from the network entity, status information identifying a first portion of an application policy associated with the UA that was successfully applied and a second portion of the application policy that was not successfully applied, and
receive a SIP message from the network, the SIP message including a set of modified via headers, the set of modified via headers being modified by an application server of the communications network in accordance with the first portion of the application policy associated with the UA.

14. The UA of claim 13, wherein the UA is at least one of a third generation partnership project (3GPP) user equipment, a wireless device, a set-top box, a phone, a computer, and a SIP user agent.

15. The UA of claim 13, wherein the application policy identifies a SIP message header field to remove, and wherein the processor is configured to:
receive a modified SIP message, wherein the SIP message header field identified by the application policy is not included in the modified SIP message.

16. The UA of claim 13, wherein the application policy identifies a SIP message header field to modify, and wherein the processor is configured to:
receive a modified SIP message, wherein the SIP message header field identified by the application policy is modified in accordance with the application policy in the modified SIP message.

17. The UA of claim 13, wherein the application policy identifies a SIP message header field to include, and wherein the processor is configured to:
receive a modified SIP message, wherein the SIP message header field identified by the application policy is included in the modified SIP message.

18. The UA of claim 13, wherein the application policy further identifies an attribute of the at least one of a SIP message header field to include, a SIP message header field to remove, a SIP message header field to allow, and a SIP message header field to modify, the attribute including at least one of an indication of message direction, an identifier of a service or application, a SIP method name, and a SIP response code.

19. A method of communicating with a communications network implementing an internet protocol (IP) multimedia subsystem (IMS), comprising:
receiving a request for an application policy from a network entity;
sending a message to the network entity in response to the request for the application policy, the message identifying an application policy, and
receiving, from the network entity, status information of an application of the application policy, wherein the status information identifies a first portion of the application policy that was successfully applied and a second portion of the application policy that was not successfully applied.

20. The method of claim 19, wherein the message includes a uniform resource identifier (URI), the URI identifying a location of the application policy within a database.

21. The method of claim 19, wherein the message contains the application policy.

22. The method of claim 21, wherein the application policy is encoded using extensible markup language (XML).

23. The method of claim 19, wherein the message includes at least one of a SIP SUBSCRIBE, a SIP REGISTER, a SIP MESSAGE, a SIP INFO, a SIP OPTION, a SIP PUBLISH, and a SIP REFER request.

24. The method of claim 19, wherein the message includes a SIP signaling compression (SigComp) transmission.

25. The method of claim 19, wherein the message includes a message session relay protocol (MSRP) message after a SIP session is established between the UA and a policy provider.

* * * * *